US012744328B2

(12) United States Patent
Lee et al.

(10) Patent No.: US 12,744,328 B2
(45) **Date of Patent: *Sep. 22, 2026**

(54) ANTENNA STRUCTURE AND ELECTRONIC DEVICE INCLUDING THE SAME

(71) Applicant: Samsung Electronics Co., Ltd., Suwon-si (KR)

(72) Inventors: Bumhee Lee, Suwon-si (KR); Seungtae Ko, Suwon-si (KR); Junsig Kum, Suwon-si (KR); Yoongeon Kim, Suwon-si (KR); Seokmin Lee, Suwon-si (KR); Youngju Lee, Suwon-si (KR); Jongmin Lee, Suwon-si (KR); Seungho Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/819,279

(22) Filed: Aug. 29, 2024

(65) Prior Publication Data

US 2024/0429618 A1 Dec. 26, 2024

Related U.S. Application Data

(63) Continuation of application No. 18/075,850, filed on Dec. 6, 2022, now Pat. No. 12,107,334, which is a
(Continued)

(30) Foreign Application Priority Data

Oct. 8, 2021 (KR) ........................ 10-2021-0134343

(51) Int. Cl.
*H01Q 21/00* (2006.01)
*H01Q 1/24* (2006.01)

(52) U.S. Cl.
CPC ......... *H01Q 21/0006* (2013.01); *H01Q 1/246* (2013.01)

(58) Field of Classification Search
CPC ........................... H01Q 21/0006; H01Q 1/246
See application file for complete search history.

(56) References Cited

U.S. PATENT DOCUMENTS

| | | | |
|---|---|---|---|
| 12,021,307 | B2 | 6/2024 | Kim et al. |
| 2009/0231226 | A1 | 9/2009 | Quan et al. |

(Continued)

FOREIGN PATENT DOCUMENTS

| | | | |
|---|---|---|---|
| CN | 105049133 | A | 11/2015 |
| CN | 108417961 | A | 8/2018 |

(Continued)

OTHER PUBLICATIONS

International Search Report dated Jan. 19, 2023, issued in International Patent Application No. PCT/KR2022/014957.

(Continued)

*Primary Examiner* — Graham P Smith
(74) *Attorney, Agent, or Firm* — Jefferson IP Law, LLP

(57) ABSTRACT

The disclosure relates to a fifth generation (5G) or pre-5G communication system supporting higher data rates after a fourth generation (4G) communication system such as Long Term Evolution (LTE). A module in a wireless communication system is provided. The module includes a plurality of antenna elements, an antenna substrate coupled to the plurality of antenna elements, a metal plate coupled to the antenna substrate, a calibration substrate coupled to a Radio Frequency (RF) component on a first face, and a conductive adhesive material for electrical coupling between the metal plate and the calibration substrate. The conductive adhesive material may be coupled to the calibration substrate on a second face different from the first face of the calibration (Continued)

substrate. The conductive adhesive material may include an air gap formed along a signal line included in the calibration substrate.

20 Claims, 15 Drawing Sheets

Related U.S. Application Data continuation of application No. PCT/KR2022/014957, filed on Oct. 5, 2022.

(56) References Cited

U.S. PATENT DOCUMENTS

| | | | |
|---|---|---|---|
| 2019/0268046 | A1 | 8/2019 | Kim et al. |
| 2020/0352060 | A1 | 11/2020 | Kim et al. |
| 2021/0005957 | A1 | 1/2021 | Han et al. |
| 2021/0005962 | A1 | 1/2021 | Han et al. |

FOREIGN PATENT DOCUMENTS

| | | | |
|---|---|---|---|
| CN | 109149128 | A | 1/2019 |
| CN | 208889846 | U | 5/2019 |
| CN | 109994820 | A | 7/2019 |
| CN | 209418768 | U | 9/2019 |
| CN | 113363734 | A | 9/2021 |
| KR | 10-1252687 | B1 | 4/2013 |
| KR | 10-2018-0055772 | A | 5/2018 |
| KR | 10-2020-0127782 | A | 11/2020 |
| KR | 10-2021-0027936 | A | 3/2021 |
| WO | 2016/065859 | A1 | 5/2016 |
| WO | 2021/045512 | A1 | 3/2021 |
| WO | 2021/201529 | A1 | 10/2021 |

OTHER PUBLICATIONS

Extended European Search Report dated Oct. 1, 2024, issued in European Patent Application No. 22878871.7.

Korean Notice of Patent dated Nov. 18, 2025, issued in Korean Patent Application No. 10-2021-0134343.

European Office Action dated May 27, 2026, issued in European Patent Application No. 22878871.7.

ANTENNA STRUCTURE AND ELECTRONIC DEVICE INCLUDING THE SAME

CROSS-REFERENCE TO RELATED APPLICATION(S)

This application is a continuation application of prior application Ser. No. 18/075,850, filed on Dec. 6, 2022, which is a continuation application, claiming priority under § 365 (c), of an International application No. PCT/KR2022/014957, filed on Oct. 5, 2022, which is based on and claims the benefit of a Korean patent application number 10-2021-0134343, filed on Oct. 8, 2021, in the Korean Intellectual Property Office, the disclosure of which is incorporated by reference herein in its entirety.

TECHNICAL FIELD

The disclosure relates to a wireless communication system. More particularly, the disclosure relates to an antenna structure and an electronic device including the antenna structure in the wireless communication system.

BACKGROUND ART

To meet the demand for wireless data traffic having increased since deployment of fourth generation (4G) communication systems, efforts have been made to develop an improved fifth generation (5G) or pre-5G communication system. Therefore, the 5G or pre-5G communication system is also called a "Beyond 4G Network" or a "Post Long term evolution (LTE) System".

The 5G communication system is considered to be implemented in higher frequency (millimeter wave (mmWave)) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (COMP), reception-end interference cancellation and the like.

In the 5G system, hybrid frequency-shifting keying (FSK) and quadrature amplitude modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

In the 5G system, an electronic device includes a plurality of antenna elements. The electronic device may include a network for calibration (i.e., a Calibration Network (Cal NW)) to control a power & phase level for each of the plurality of antenna elements. The electronic device may effectively perform beamforming, through the Cal NW. With the increase in the number of antenna elements required for the beamforming, the electronic device is required to be designed in a more effective structure in consideration of production cost and radiation performance of the antenna structure.

The above information is presented as background information only to assist with an understanding of the disclosure. No determination has been made, and no assertion is made, as to whether any of the above might be applicable as prior art with regard to the disclosure.

DISCLOSURE

Technical Problem

Aspects of the disclosure are to address at least the above-mentioned problems and/or disadvantages and to provide at least the advantages described below. Accordingly, an aspect of the disclosure is to provide a structure of an antenna module including a Calibration Network (Cal NW) with a closed-loop structure in a wireless communication system.

Another aspect of the disclosure is to provide a structure capable of minimizing an error (i.e., a tolerance) in a manufacturing process while reducing production cost by using an antenna module including a Cal NW with a closed-loop structure in a wireless communication system.

Another aspect of the disclosure is to provide a structure capable of improving signal transmission efficiency by using an antenna module including a Cal NW with a closed-loop structure in a wireless communication system.

Additional aspects will be set forth in part in the description which follows and, in part, will be apparent from the description, or may be learned by practice of the presented embodiments.

Technical Solution

In accordance with an aspect of the disclosure, a module in a wireless communication system is provided. The module includes a plurality of antenna elements, an antenna substrate coupled to the plurality of antenna elements, a metal plate coupled to the antenna substrate, a calibration substrate coupled to a radio frequency (RF) component on a first face, and a conductive adhesive material for electrical coupling between the metal plate and the calibration substrate. The conductive adhesive material may be coupled to the calibration substrate on a second face different from the first face of the calibration substrate. The conductive adhesive material may include an air gap formed along a signal line included in the calibration substrate.

In accordance with another aspect of the disclosure, a massive multiple input multiple output (MIMO) unit (MMU) device is provided. The MMU device includes a main board, a radio frequency integrated circuit (RFIC) disposed to the main board, and a plurality of antenna modules disposed to the main board. Each of the plurality of antenna modules may include a plurality of antenna elements, an antenna substrate coupled to the plurality of antenna elements, a metal plate coupled to the antenna substrate, a calibration substrate coupled to an RF component on a first face, and a conductive adhesive material for electrical coupling between the metal plate and the calibration substrate. The conductive adhesive material may be coupled to the calibration substrate on a second face different from the first face of the calibration substrate. The conductive adhesive material may include an air gap formed along a signal line included in the calibration substrate.

Advantageous Effects

An apparatus according to various embodiments of the disclosure has a structure of an antenna module including a Calibration Network (Cal NW) with a closed-loop structure in a wireless communication system, thereby manufacturing an antenna in a cost effective manner.

An apparatus according to various embodiments of the disclosure has a structure of an antenna module including a Cal NW with a closed-loop structure in a wireless communication system, thereby reducing an error in a manufacturing process.

An apparatus according to various embodiments of the disclosure has a structure of an antenna module including a Cal NW with a closed-loop structure in a wireless communication system, thereby improving signal transmission efficiency.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

MODE FOR INVENTION

Figure 1A:
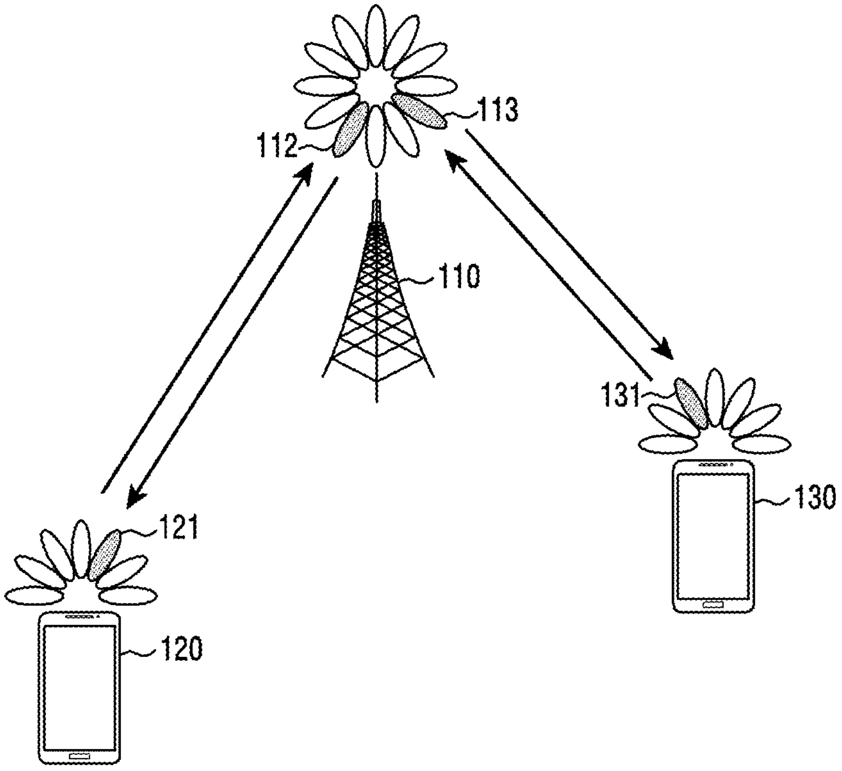
FIG. 1A illustrates a wireless communication system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms “a,” “an,” and “the” include plural referents unless the context clearly dictates otherwise. Thus, for example, reference to “a component surface” includes reference to one or more of such surfaces.

Terms used in the disclosure are for the purpose of describing particular embodiments only and are not intended to limit other embodiments. All terms (including technical and scientific terms) used herein have the same meaning as commonly understood by those ordinarily skilled in the art disclosed in the disclosure. It will be further understood that terms, such as those defined in commonly used dictionaries, should be interpreted as having a meaning that is consistent with their meaning in the context of the relevant art, and will not be interpreted in an idealized or overly formal sense unless expressly so defined herein. Optionally, the terms defined in the disclosure should not be interpreted to exclude the embodiments of the disclosure.

A hardware-based approach is described for example in the various embodiments of the disclosure described hereinafter. However, since the various embodiments of the disclosure include a technique in which hardware and software are both used, a software-based approach is not excluded in the embodiments of the disclosure.

In the following description, terms referring to components (a module, a plate, a substrate, a Printed Circuit Board (PCB), a board, a network, a line, a transmission line, a signal line, a feeding line, a power divider, an antenna, an antenna array, a sub array, an antenna element, a feeding unit, a feeding point, a member, and a material) of an apparatus and terms referring to features (conductive, adhesive) of the components or the like are used for convenience of explanation. Therefore, the disclosure is not limited to the terms described below, and thus other terms having the same technical meaning may also be used.

An antenna module or a module may mean a structure including a plurality of antenna elements and a PCB including a calibration substrate. The PCB may mean a structure in which a plurality of substrates are layered.

In addition, although the disclosure describes various embodiments by using terms used in some communication standards (e.g., 3rd Generation Partnership Project (3GPP)), this is for exemplary purposes only. Various embodiments of the disclosure may be easily modified and applied to other communication systems.

FIG. 1A illustrates a wireless communication system according to an embodiment of the disclosure.

Referring to FIG. 1A, as part of nodes which use a wireless channel in a wireless communication system, a base station 110, a terminal 120, and a terminal 130 are exemplified. Although only one base station is illustrated in FIG. 1A, another base station identical to or different from the base station 110 may be further included.

The base station 110 is a network infrastructure which provides a radio access to the terminals 120 and 130. The base station 110 has a coverage defined as a specific geographic region on the basis of a distance in which a signal is transmittable. In addition to the term 'base station', the base station 110 may be referred to as an 'Access Point (AP)', an 'eNodeB (eNB)', a '5th Generation (5G) node', a 'wireless point', a 'Transmission/Reception Point (TRP)', or other terms having equivalent technical meanings.

As a device used by a user, each of the terminals 120 and 130 communicates with the base station 110 through the wireless channel. Optionally, at least one of the terminals 120 and 130 may be operated without user involvement. That is, as a device for performing Machine Type Communication (MTC), at least one of the terminals 120 and 130 may not be carried by the user. In addition to the term 'terminal', each of the terminals 120 and 130 may be referred to as a 'User Equipment (UE)', a 'mobile station', a 'subscriber station', a 'Customer Premise Equipment (CPE)' a 'remote terminal', a 'wireless terminal', a 'user device', or other terms having equivalent technical meanings.

The base station 110, the terminal 120, and the terminal 130 may transmit and receive a radio signal at a millimeter Wave (mmWave) band (e.g., 28 GHz, 30 GHZ, 38 GHz, 60 GHz). In this case, to improve a channel gain, the base station 110, the terminal 120, and the terminal 130 may perform beamforming. The beamforming may include transmission beamforming and reception beamforming. That is, the base station 110, the terminal 120, and the terminal 130 may assign a directivity to a transmission signal and or a reception signal. For this, the base station 110 and the terminals 120 and 130 may select serving beams 112, 113, 121, and 131 through a beam search or beam management procedure. After the serving beams 112, 113, 121, and 131 are selected, subsequent communication may be performed through a resource having a Quasi Co-Located (QCL) relation with a resource used to transmit the serving beams 112, 113, 121, and 131.

The base station 110 or the terminals 120 and 130 may include an antenna array. Each antenna included in the antenna array may be referred to as an array element or an antenna element. Although the antenna array is illustrated as a 2-dimensional planar array in the disclosure, this is for exemplary purposes only, and other embodiments of the disclosure are not limited thereto. The antenna array may be configured in various shapes such as a linear array, a multi-layer array, or the like. The antenna array may be referred to as a massive antenna array. In addition, the antenna array may include a plurality of sub arrays including a plurality of antenna elements.

Figure 1B:
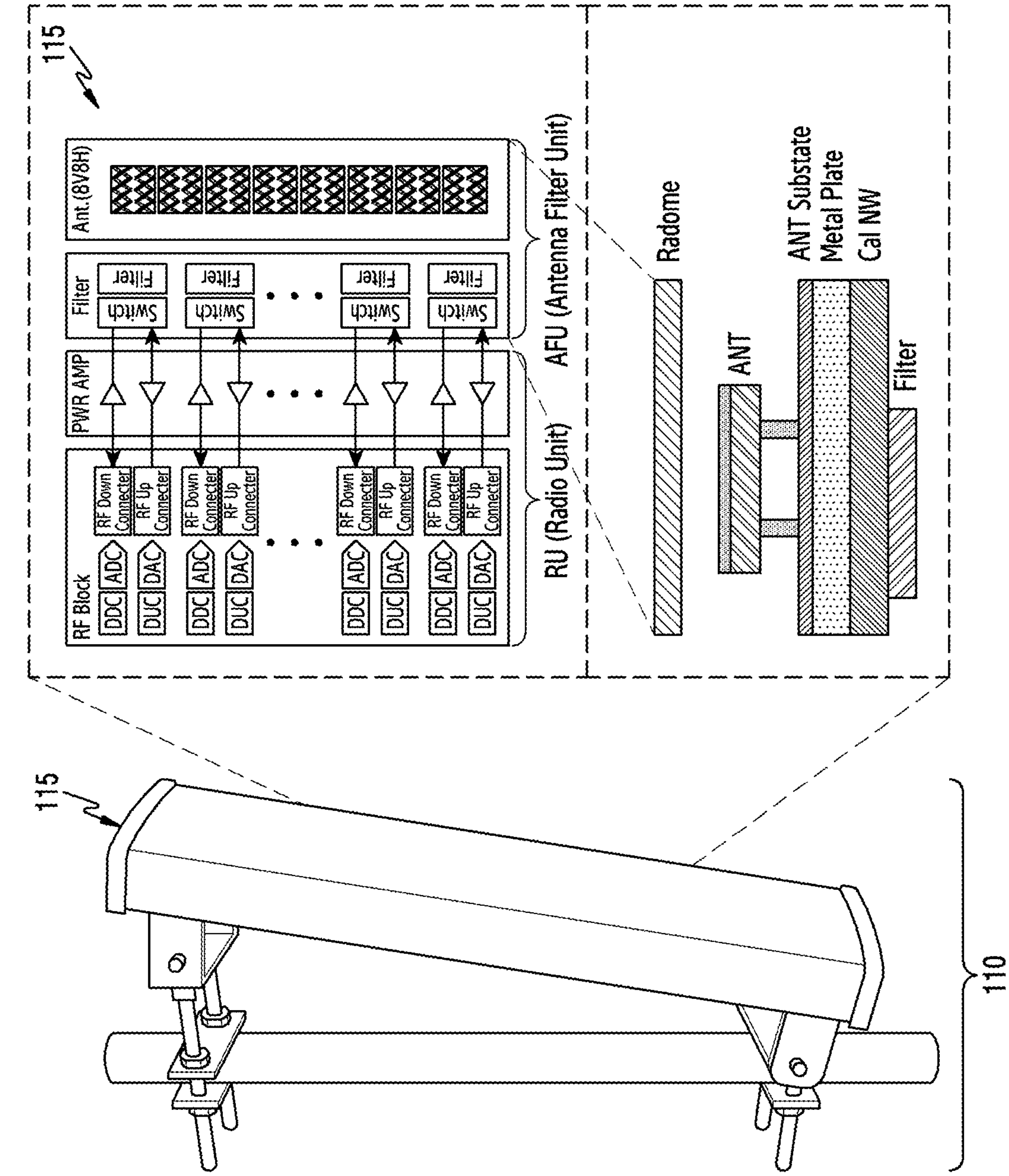
FIG. 1B illustrates an example for a configuration of a Massive Multiple Input Multiple Output (MIMO) Unit (MMU) in a wireless communication system according to an embodiment of the disclosure.

FIG. 1B illustrates an example for a configuration of a Massive Multiple Input Multiple Output (MIMO) Unit (MMU) in a wireless communication system according to an embodiment of the disclosure.

The term '. . . unit', '. . . device', or the like implies a unit of processing at least one function or operation, and may be implemented in hardware or software or in combination of the hardware and the software.

Referring to FIG. 1B, the base station 110 may be constructed of an MMU device 115. The MMU device 115 may include a plurality of antenna elements. In order to increase a beamforming gain, a large number of antenna elements may be used, compared to input ports. The MMU device 115 may perform beamforming through a plurality of sub-arrays.

Referring to FIG. 1B, the MMU device 115 may include a Radio Unit (RU) and an Antenna Filter Unit (AFU). The RU may include an RF block and a Power Amplifier (PWR AMP) unit. The RF block may include a plurality of Digital Downlink Converters (DDCs), a plurality of Digital Uplink Converters (DUCs), a plurality of Analog to Digital Converters (ADCs), a plurality of downlink converters, and a plurality of uplink converters. The PWR AMP unit may include a Power Amplifier (PA) and Low-Noise Amplifiers (LNAs). The RU may correspond to an RF processing unit 913 of FIG. 9. The AFU may include a filter unit and an antenna unit (Ant). The filter unit may include a filter and a switch, and the antenna unit may be constructed of at least one antenna array. Each antenna array may include a plurality of sub-arrays, and each sub-array may include a plurality of antenna elements. The AFU may correspond to a filter unit 912 and antenna unit 911 of FIG. 9.

In the figure described below, which is an example of a layered structure of the AFU viewed from one side, the AFU may include a radome, an antenna element (ANT), an antenna substrate, a metal plate, and a Calibration Network (Cal NW), and a filter. However, this is only an example of the layered structure of the AFU, and does not mean that the disclosure is limited thereto. In other words, the AFU may further include a conductive adhesive material to be described below. Although the AFU structure of FIG. 1B is referred to as the layered structure of the AFU, a layered structure of substrates may be referred to as a structure of a Printed Circuit Board (PCB). In addition, a structure in which the PCB and the antenna elements are coupled may be referred to as an antenna module or a module. In other words, the AFU may include at least one antenna module.

Although not disclosed in FIG. 1B, the MMU device 115 may include a main PCB. The main PCB may be referred to as a main board, a mother board, and the like. The antenna substrate may be disposed to the main PCB. In other words, an RU of the MMU device 115 may include the main PCB. An RF signal processed from a Radio Frequency Integrated Circuit (RFIC) disposed on the main PCB may be transferred to a power divider of the antenna substrate through the main PCB. The power divider may feed the transferred RF signal to a plurality of antenna elements.

Although the following description is based on the MMU structure for convenience of explanation, an apparatus to which a PCB including a Cal NW with a closed-loop structure according to embodiments of the disclosure and an antenna module including the PCB structure are applied is not limited to the MMU. That is, the structure according to embodiments of the disclosure may also be applied to an MMU using a signal of a Frequency Range 1 (FR1) band (about 6 GHZ) and an mmWave device using a signal of an FR2 band (about 24 GHZ).

Figure 2A:
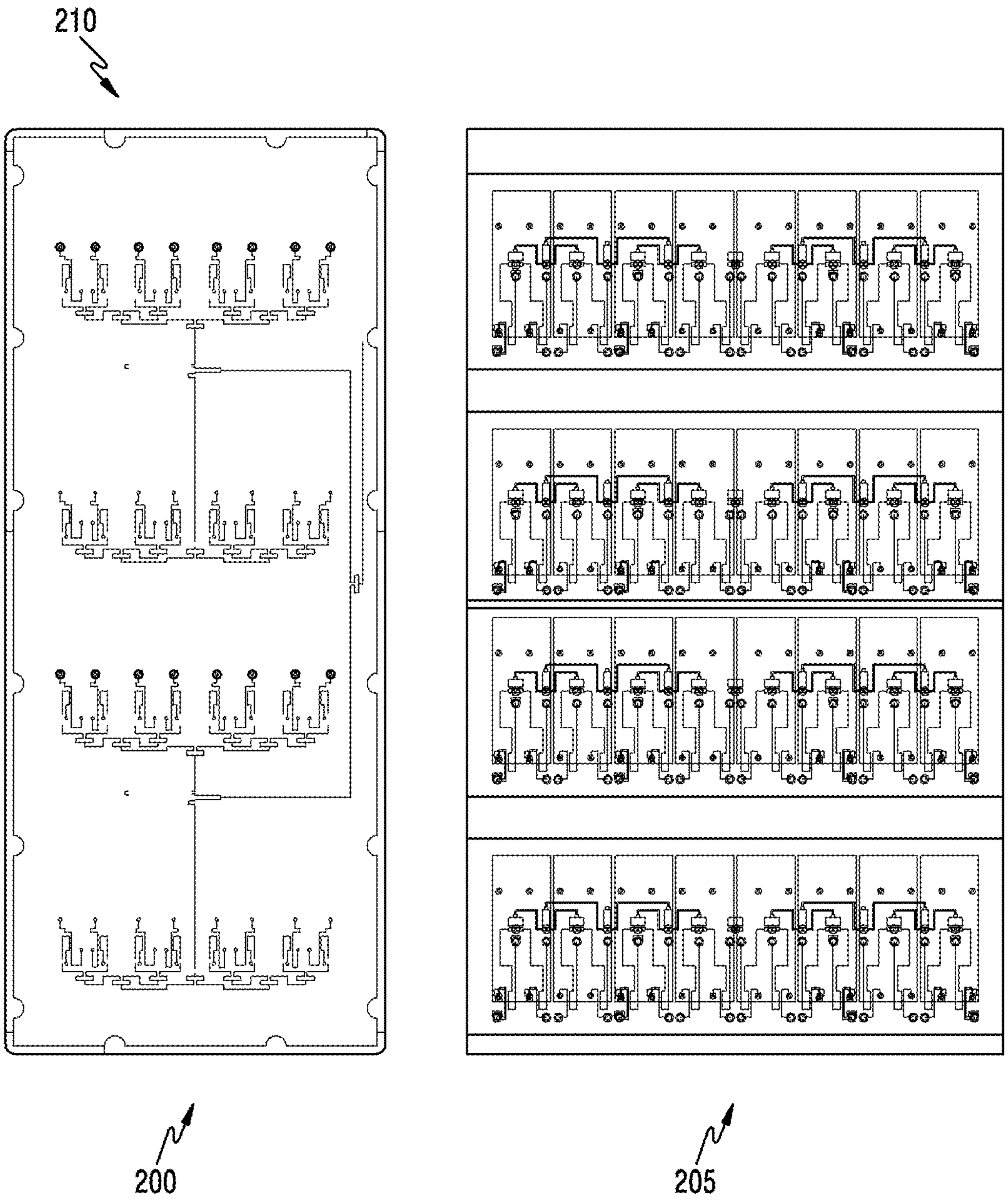
FIG. 2A illustrates examples for deployment of a Calibration Network (Cal NW) for explaining a Printed Circuit Board (PCB) structure including the Cal NW with a closed-loop structure according to an embodiment of the disclosure.

FIG. 2A illustrates examples for deployment of a Cal NW for explaining a PCB structure including the Cal NW with a closed-loop structure according to an embodiment of the disclosure.

Examples for a structure of the Cal NW are illustrated in FIG. 2A. The Cal NW may mean a structure for constantly managing a power & phase level between antenna elements when the base station 110 performs beamforming. That is, the Cal NW may include a structure for increasing an isolation level between the antenna elements. For example, the Cal NW may include a calibration substrate and RF components coupled to the calibration substrate. In addition, the Cal NW may include a conductive adhesive material for coupling the calibration substrate to a different substrate or a different construction.

Referring to FIG. 2A, a first Cal NW 200 and a second Cal NW 205 are illustrated. Referring to the first Cal NW 200, a calibration substrate (or a calibration board) of the first Cal NW 200 may be configured to have a size similar to that of the antenna substrate 210. The first Cal NW 200 may be coupled to the antenna substrate 210 on a second face opposite to a first face of the antenna substrate 210 coupled to antenna elements. One calibration substrate of the first Cal NW 200 may include a plurality of couplers for electrical coupling with the plurality of antenna elements. The plurality of couplers may be combined through a single combiner, and the plurality of combiners may be combined again through the single combiner.

Alternatively, the second Cal NW 205 may include a plurality of calibration substrates. Each calibration substrate of the second Cal NW 205 may be configured to have a smaller size than the antenna substrate 210. In other words, a sum of sizes of the plurality of calibration substrates of the second Cal NW 205 may be configured to have a size smaller than that of the antenna substrate 210. In addition, unlike the first Cal NW 200, the second Cal NW 205 may include a plurality of couplers for coupling each of the calibration substrates and the plurality of antenna elements and at least one combiner for combining the plurality of couplers. Unlike the first Cal NW 200, the second Cal NW 205 may not include a combiner to couple the calibration substrates. In other words, in the calibration substrate of the second Cal NW 205, instead of coupling each of the calibration substrates, structures of calibration substrates may be electrically coupled in different substrates or at least one layer in a layered structure. As a result, the second Cal NW 205 may be configured to have a smaller size than that of the first Cal NW 200. Since the size of the calibration substrate constituting the second Cal NW 205 is small, production cost may be reduced.

Figure 2B:
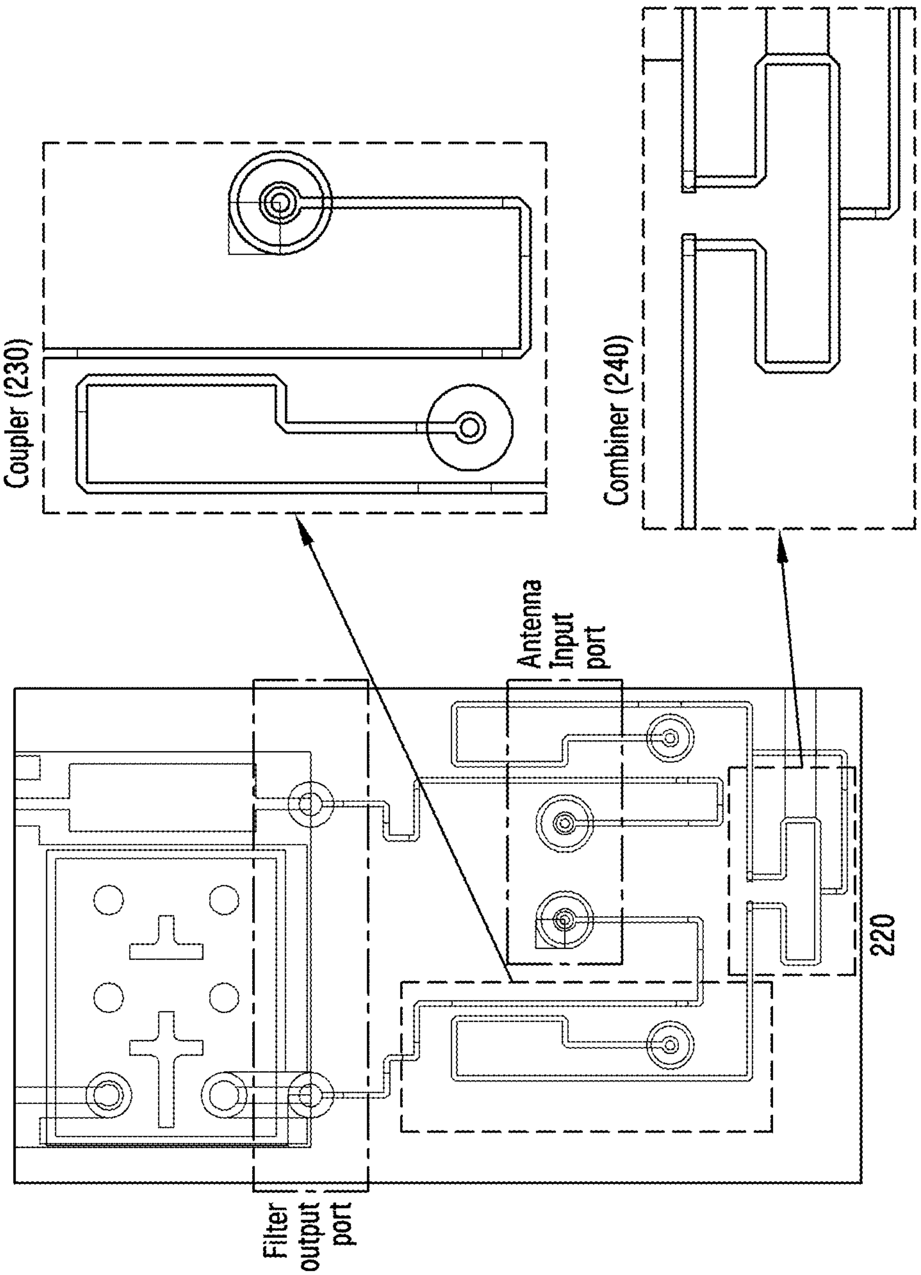
FIG. 2B illustrates an example of a configuration of a Cal NW for explaining a PCB structure including a Cal NW with a closed-loop structure according to an embodiment of the disclosure.

FIG. 2B illustrates an example of a configuration of a Cal NW for explaining a PCB structure including a Cal NW with a closed-loop structure according to an embodiment of the disclosure.

The configuration of the Cal NW of FIG. 2B may be an example of the configuration of the Cal NWs 200 and 205 of FIG. 2A or a configuration of a Cal NW with a closed-loop structure according to embodiments of the disclosure.

Referring to FIG. 2B, a Cal NW 220 may couple a filter and an antenna element. The Cal NW 220 may couple an output port of the filter and an input port of the antenna element. In addition, the Cal NW 220 may include a coupler 230 and a combiner 240, to couple the filter and the element. Although the Cal NW 220 including one coupler 230 and combiner 240 is illustrated in FIG. 2B, the disclosure is not limited thereto. Therefore, the Cal NW 220 may include the plurality of couplers 230 and the plurality of combiners 240. The coupler 230 of the Cal NW 220 may be configured to couple the antenna element and the filter. The combiner 240 of the Cal NW 220 may be configured to combine the coupler 230 and another coupler (not shown). In this case, the coupler 230 and the combiner 240 may be configured through a transmission line (or a signal line) as described below with reference to FIG. 2C.

Figure 2C:
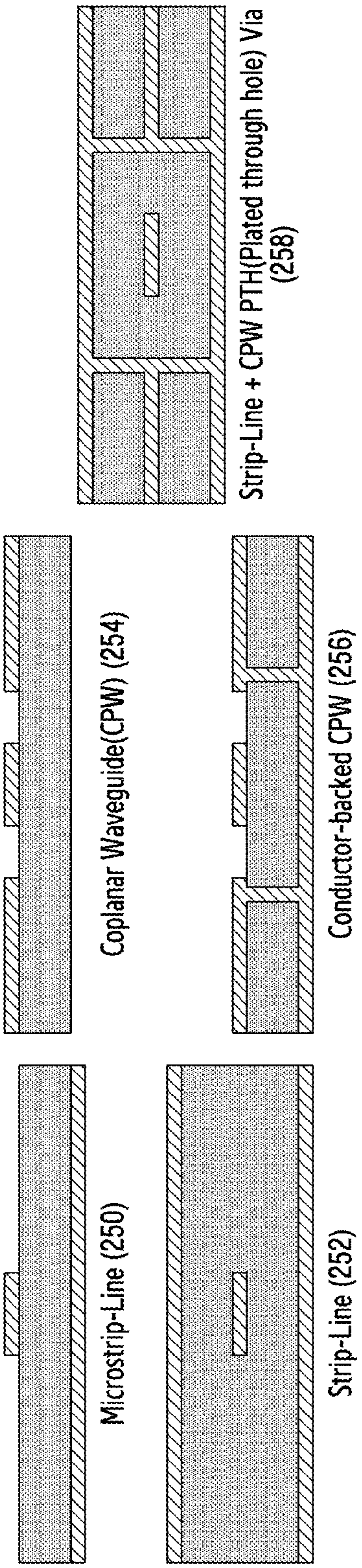
FIG. 2C illustrates examples of a transmission line for explaining a PCB structure including a Cal NW with a closed-loop structure according to an embodiment of the disclosure.

FIG. 2C illustrates examples of a transmission line for explaining a PCB structure including a Cal NW with a closed-loop structure according to an embodiment of the disclosure. The transmission lines of FIG. 2C may mean signal lines included in the Cal NW 220. In other words, the transmission lines of FIG. 2C may be components constituting the coupler and combiner of the Cal NW 220.

Referring to FIG. 2C, a first transmission line 250, a second transmission line 252, a third transmission line 254, a fourth transmission line 256, and a fifth transmission line 258 are illustrated. The first transmission line 250 may be referred to as a microstrip-line. The first transmission line 250 may include a signal line, a dielectric layer, and a metal layer serving as a Ground (GND). The second transmission line 252 may be referred to as a strip-line. The second transmission line 252 may include a signal line, a dielectric layer surrounding the signal line, and two metal layers. The third transmission line 254 may be referred to as a Coplanar Waveguide (CPW). The third transmission line 254 may include a signal line, metal layers disposed at both sides and spaced apart from the signal line by a predetermined distance, and dielectric layers. The metal layers disposed at both sides may serve as the GND. The fourth transmission line 256 may be referred to as a conductor-backed CPW. The fourth transmission line 256 may have a structure in which a metal layer disposed to a lower face of the third transmission line 254 is further included and a via is provided to couple the metal layer of the lower face and metal layers of an upper face. Accordingly, the metal layer of the lower face and each of the metal layers of the upper face may serve as the GND. The fifth transmission line 258 may have a structure in which the second transmission line 252 and the third transmission line 254 are coupled through the via. The fifth transmission line 258 may be constructed of a calibration substrate (or a calibration board) having two cores. The fifth transmission line 258 may include two separate dielectric layers with the signal line therebetween, and each dielectric layer may be referred to as a core. Accordingly, the signal line of the fifth transmission line 258 may be isolated from the outside, so that the fifth transmission line 258 may have a high isolation feature. However, the structure of the fifth transmission line 258 has a complicated structure, which may result in high production cost and a tolerance problem in manufacturing.

Figure 3A:
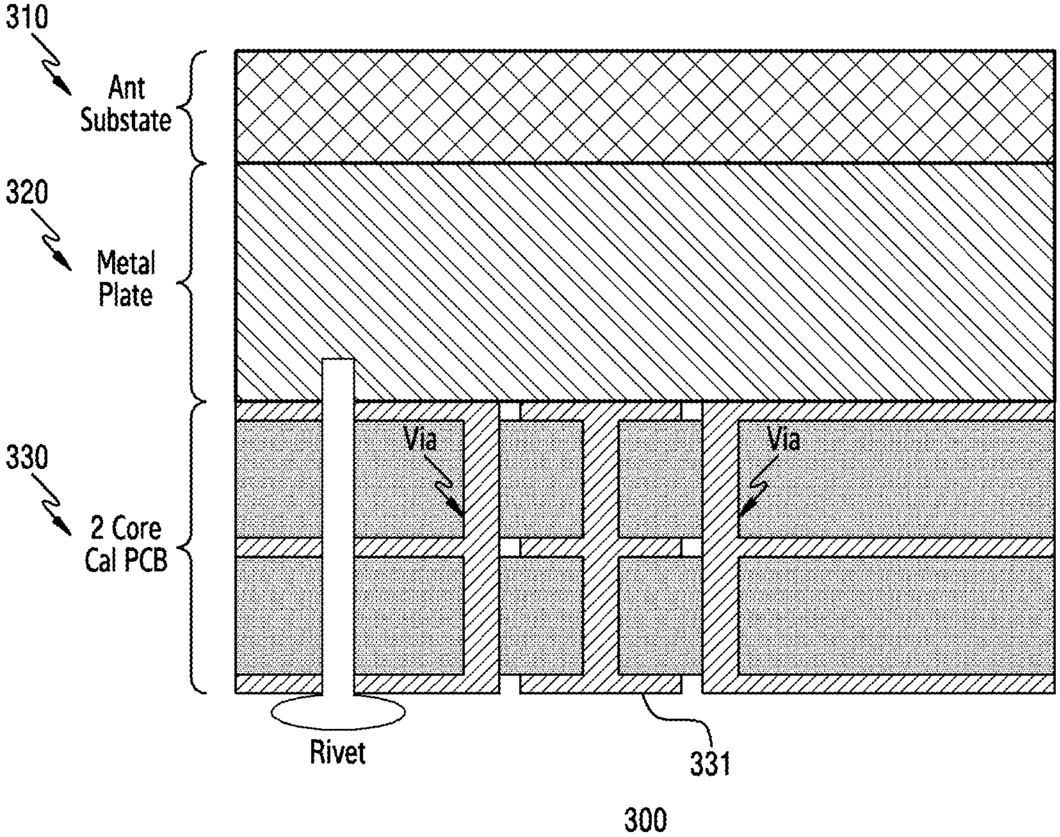
FIG. 3A illustrates an example of a PCB structure including a Cal NW with a closed-loop structure according to an embodiment of the disclosure.

FIG. 3A illustrates an example of a PCB structure including a Cal NW with a closed-loop structure according to an embodiment of the disclosure.

The PCB structure of FIG. 3A may be a PCB including a Cal NW with a structure of the fifth transmission line 258 of FIG. 2C. A PCB 300 of FIG. 3A may be an example for a portion of the AFU of FIG. 1B. For convenience of explanation, a first face may mean a face facing an upward direction of the figure, and a second face may mean a face facing a downward direction of the figure.

Referring to FIG. 3A, the PCB 300 may include an antenna substrate (or an antenna board) 310, a metal plate 320, and a calibration substrate 330. The antenna substrate 310 may be coupled to a plurality of antenna elements (not shown) on a first face. The antenna substrate 310 may be constructed of a dielectric (e.g., PolyEthylene Terephthalate (PET)) and an adhesive material. The antenna substrate 310 may be referred to as an antenna PCB, an antenna board, or an antenna substrate. The antenna substrate 310 may be coupled to a first face of the metal plate 320 on a second face facing away from the first face. The metal plate 320 may be constructed of a conductive material such as metal, for electrical coupling between a filter (not shown) and an antenna element. The metal plate 320 may be coupled to the first face of the calibration substrate 330 on a second face of the metal plate. The calibration substrate 330 may be constructed of a 2-core substrate, as a structure of the fifth transmission line 258 of FIG. 2C. In other words, the calibration substrate 330 may mean a structure coupled through the via in a structure of coupling the strip-line and a CPW. The calibration substrate 330 may include a signal line 331. The signal line 331 may couple a filter (not shown) and the metal plate 320. The filter may be coupled to the second face of the calibration substrate 330. When the electronic device transmits a signal, a signal processed from the filter may be transferred to an antenna element through the signal line 331. When the electronic device receives a signal, a signal received through the antenna element may be transferred to the filter through the signal line 331. Although one signal line 331 is illustrated for example in FIG. 3A, the signal line 331 is only for convenience of explanation. Therefore, the calibration substrate 330 may include the plurality of signal lines 331. The calibration substrate 330 may be coupled to the metal plate 320 through a bonding member (e.g., a rivet, a screw).

As described above, a Cal NW structure including the conventional calibration substrate and filter and a PCB structure including the Cal NW structure require a complex calibration substrate structure (e.g., a 2-core substrate structure), to secure a high isolation feature with respect to other antenna elements. Accordingly, there may be an increase in cost for producing the complex calibration substrate, and a complex structure may lead to a high tolerance. The disclosure proposes a structure of an antenna module including a Cal NW with a closed-loop structure. The antenna module including the Cal NW with the closed-loop structure may reduce production cost and minimize a tolerance through a relatively simple calibration substrate structure. In addition, the antenna module including the Cal NW with the closed-loop structure may also minimize a loss caused by a transmission line through a calibration substrate including an air gap formed along a signal line.

Figure 3B:
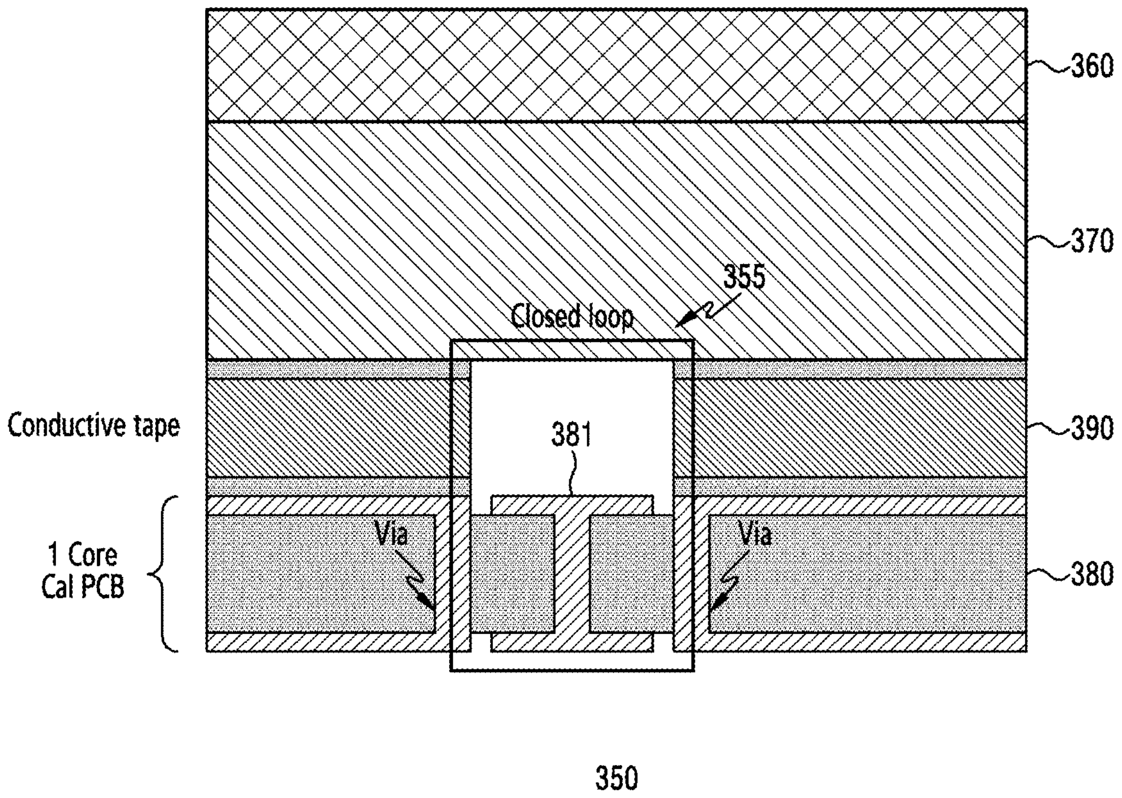
FIG. 3B illustrates an example of a PCB structure including a Cal NW with a closed-loop structure according to an embodiment of the disclosure.

FIG. 3B illustrates an example of a PCB structure including a Cal NW with a closed-loop structure according to an embodiment of the disclosure.

The PCB structure of FIG. 3B may be a PCB including a Cal NW with a structure of the fourth transmission line 256 of FIG. 2C. However, a calibration substrate including the fourth transmission line 256 is for exemplary purposes only, and the disclosure is not limited thereto. The calibration substrate included in the Cal NW may include at least one of the first transmission line 250, the second transmission line 252, the third transmission line 254, and the fourth transmission line 256 or another transmission line structure. A PCB 350 of FIG. 3B may be an example for a portion of the AFU of FIG. 1B. For convenience of explanation, a first face may mean a face facing an upward direction of the figure, and a second face may mean a face facing a downward direction of the figure. An antenna module according to embodiments of the disclosure may include the structure of the PCB and a plurality of antenna elements.

Referring to FIG. 3B, the PCB 350 may include an antenna substrate (or an antenna board) 360, a metal plate 370, a calibration substrate 380, and a conductive adhesive material.

According to an embodiment, the antenna substrate 360 may be coupled to a plurality of antenna elements (not shown) on a first face. The antenna substrate 360 may be constructed of a dielectric (e.g., PET) and an adhesive material. The antenna substrate 360 may be referred to as an antenna PCB, an antenna board, or an antenna substrate. The antenna substrate 360 may be coupled to a first face of the metal plate 370 on a second face facing away from the first face. The metal plate 370 may be constructed of a conductive material such as metal, to secure a GND region. The metal plate 370 may be coupled to the first face of a conductive adhesive material 390 on a second face of the metal plate 370.

According to another embodiment, the conductive adhesive material 390 may be a layer or substrate of an adhesive material having conductivity. As described below with reference to FIGS. 8A to 8C, for example, the conductive adhesive material 390 may include a metal sheet and an adhesive or conductive tape. A case where the conductive adhesive material 390 is constructed of the conductive tape is illustrated for example in FIG. 3B. The conductive adhesive material 390 may be coupled to the metal plate 370 on a first face, and may be coupled to the calibration substrate 380 on a second face. In addition, the conductive adhesive material 390 may include an air gap formed along a region corresponding to a region in which the signal line 381 of the calibration substrate 380 exists. The conductive adhesive material 390 may be included in the Cal NW.

According to yet another embodiment, the calibration substrate 380 may be constructed of a 1-core substrate, as a structure of the fourth transmission line 256 of FIG. 2C. In other words, the calibration substrate 380 may include a conductor-backed CPW. The calibration substrate 380 may include a signal line 381. The filter may be coupled to the second face of the calibration substrate 380. However, the calibration substrate 380 includes the structure of the fourth transmission line 256, which is for exemplary purposes only. Accordingly, the calibration substrate 380 may include a structure of another transmission line (e.g., the third transmission line 254) or a combination of a plurality of transmission line structures.

According to yet another embodiment, as described below with reference to FIG. 8A, the PCB 350 may further include a connector coupled to the signal line 381 in a region (e.g., a port or an ANT port) in which the signal line 381 and an antenna element (not shown) are coupled. In case of a region in which the connector is included, the PCB 350 may include an air gap instead of the conductive adhesive material 390. Accordingly, the connector may electrically couple an antenna element to be coupled to the PCB 350 and the signal line 381 of the calibration substrate 380. When the electronic device transmits a signal, a signal processed from the filter may be transferred to an antenna element through the signal line 381 and the connector. When the electronic device receives a signal, a signal received through the antenna element may be transferred to the filter through the signal line 381 and the connector. Although one signal line 381 is illustrated for example in FIG. 3B, the signal line 381 is only for convenience of explanation. Therefore, the calibration substrate 380 may include the plurality of signal lines 381.

In addition, according to yet another embodiment, the PCB 350 may further include a bonding member (not shown) (e.g., a rivet, a screw) in order to increase bonding force. Accordingly, the calibration substrate 380 and the conductive adhesive material 390 may be coupled to the metal plate 320 through the bonding member.

As described above, the PCB structure including the Cal NW with the closed-loop structure according to embodiments of the disclosure may form a closed loop 355 through a calibration substrate, a conductive adhesive material, and a metal plate about a region in which an air gap is formed. In other words, the calibration substrate coupled to the filter may be coupled to the metal plate through the conductive adhesive material including the air gap formed along the signal line.

Figure 4:
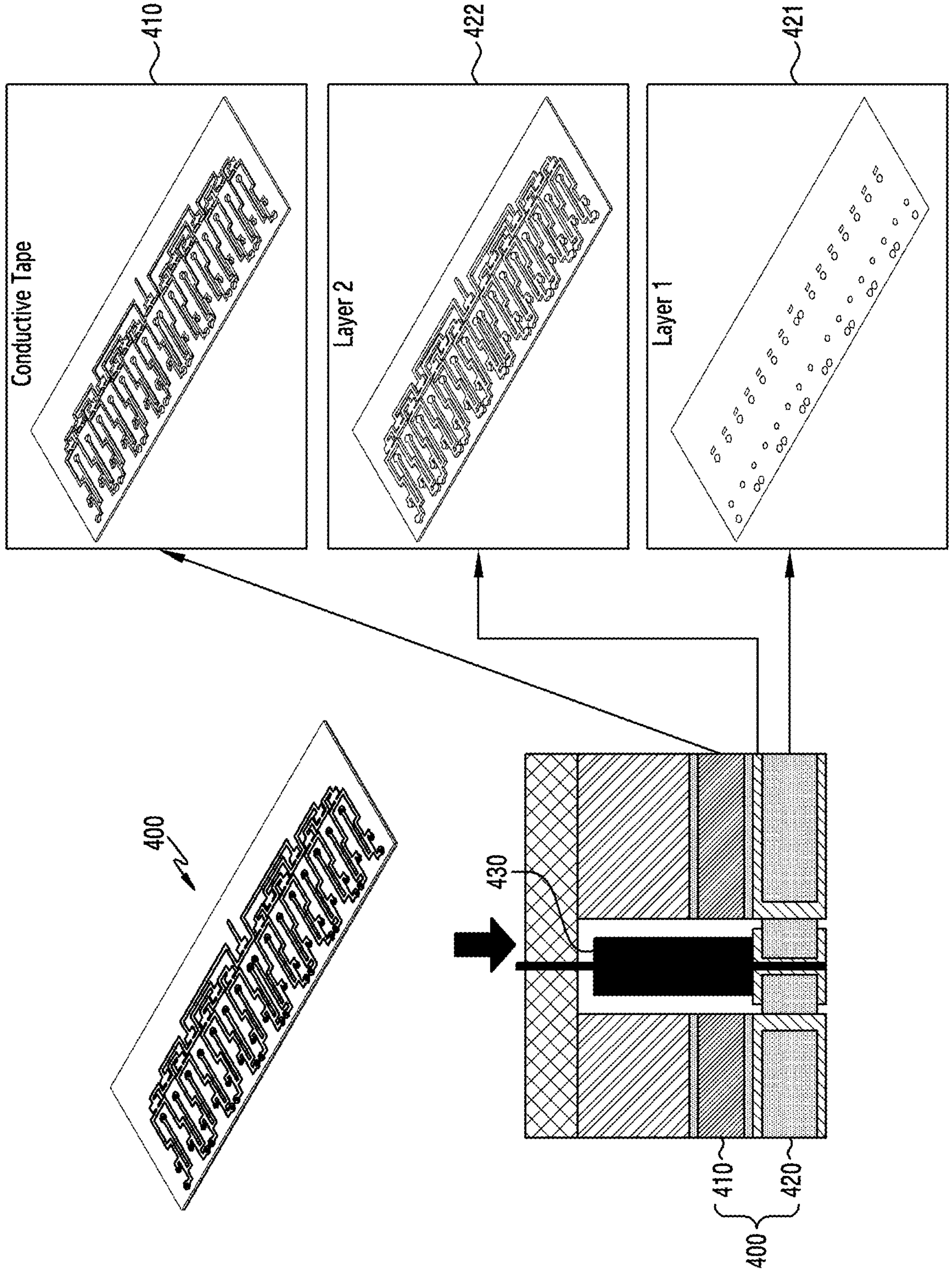
FIG. 4 illustrates an example of a layered structure for a PCB structure including a Cal NW with a closed-loop structure according to an embodiment of the disclosure.

FIG. 4 illustrates an example of a layered structure for a PCB structure including a Cal NW with a closed-loop structure according to an embodiment of the disclosure.

A Cal NW 400 of FIG. 4 may refer to a structure including RF components such as the conductive adhesive material 390 and calibration substrate 380 of FIG. 3B and a filter (not shown).

Referring to FIG. 4, the PCB may include an antenna substrate (or an antenna board), a metal plate, the Cal NW 400, and a connector 430. The Cal NW 400 may include a calibration substrate 420 and a conductive adhesive material 410. The description for the conductive adhesive material 390 and calibration substrate 380 of FIG. 3B may be equally applied to the description for the Cal NW 400 of FIG. 4. The PCB of FIG. 4 may be an example of a region (e.g., a port, an ANT port) in which an antenna element and a signal line of the calibration substrate 420 are coupled. The antenna module according to embodiments of the disclosure may include the structure of the PCB and the plurality of antenna elements.

According to an embodiment, the metal plate and the conductive adhesive material 410 may include the connector 430 in a region corresponding to a region (e.g., a port, an ANT port) in which an antenna element to be coupled to the PCB is disposed. The connector 430 may mean a structure for electrical coupling between the antenna element and the calibration substrate 420. For example, the connector 430 may be a pin connector.

According to another embodiment, the conductive adhesive material 410 may include an air gap in a region corresponding to a region in which signal lines of the calibration substrate 420 are disposed. In other words, the conductive adhesive material 410 may include adhesive materials having conductivity in a region in which the signal lines of the calibration substrate 420 are not disposed. For example, the adhesive material may refer to a material for metal-to-metal adhesion or metal-to-dielectric adhesion.

According to yet another embodiment, signal lines may be disposed on a second layer 422 of the calibration substrate 420. The signal lines may mean a construction for signal transfer between an antenna element and an RF component (e.g., a filter) coupled in one region of a first layer 421 of the calibration substrate 420. The signal lines may constitute a coupler or combiner included in the Cal NW. For example, some signal lines may be configured with a structure for coupling an input port of a plurality of antenna elements and an output port of a filter. As another example, some other signal lines may be configured with a structure for coupling the aforementioned some signal lines. In addition, a portion of the second layer 422 of the calibration substrate 420 may include a GND region.

According to yet another embodiment, the first layer 421 of the calibration substrate 420 may include the GND region. In addition, as described above, the calibration substrate 420 may include holes for coupling the RF component in one region of the first layer 421. For example, the calibration substrate 420 may be coupled to a filter, a register, a shield can, or the like, through the holes in the first layer 421.

Figure 5:
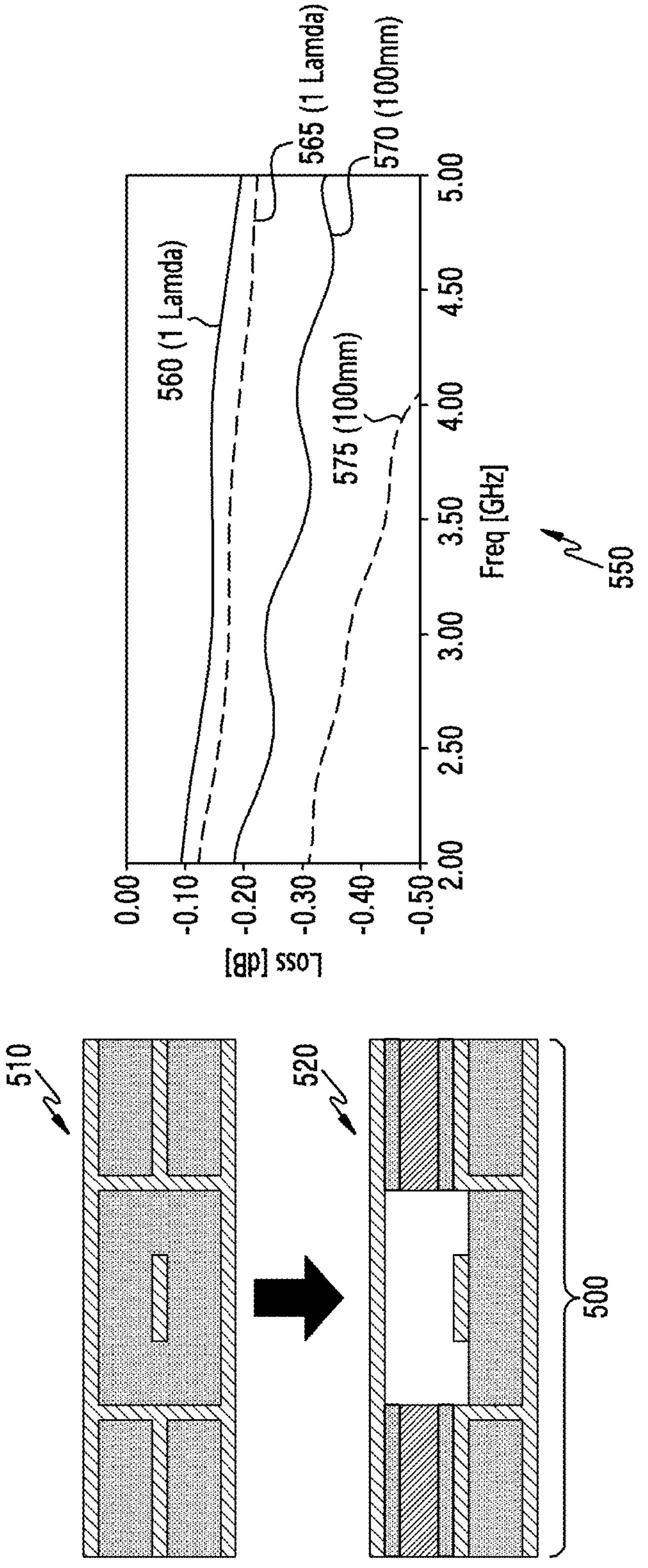
FIG. 5 illustrates an example of a structure and performance of a transmission line of a Cal MW with a closed-loop structure according to an embodiment of the disclosure.

FIG. 5 illustrates an example of a structure and performance of a transmission line of a Cal MW with a closed-loop structure according to an embodiment of the disclosure.

Referring to FIG. 5, a diagram 500 and a graph 550 are illustrated for the example of the structure and performance of the transmission line, in order to compare a loss depending on a length of the transmission line between the Cal NW with the closed-loop structure according to embodiments of the disclosure and a Cal NW including the fifth transmission line 258 of FIG. 2C.

The diagram 500 illustrates a transmission line 510 coupled through a via and a transmission line 520 configured to have a closed-loop structure, in a structure of coupling a strip-line and a CPW, according to embodiments of the disclosure. The description for the fifth transmission line 258 of FIG. 2C and the description for FIG. 3A may be equally applied to the description for the transmission line 510. The description for FIG. 3B may be equally applied to the description for the transmission line 520. The transmission line may mean a structure including a signal line.

The graph 550 illustrates an example for comparing a loss depending on a length of each of transmission lines. A horizontal axis of the graph 550 indicates frequency (unit: GHz), and a vertical axis thereof indicates decibels [dB]. The graph 550 includes a first line 560 showing a loss depending on frequency for a structure of the transmission line 520 having a length of 1 lambda, a second line 565 showing a loss depending on frequency for a structure of the transmission line 510 having a length of 1 lambda, a third line 570 showing a loss depending on frequency for a structure of the transmission line 520 having a length of 100 millimeter (mm), and a fourth line 575 showing a loss depending on frequency for a structure of the transmission line 510 having a length of 100 mm. Lambda may mean a signal wavelength.

Comparing the first line 560 and the second line 565, the first line 560 has an internal loss value of about −0.15 dB at a reference frequency band (e.g., 3.5 GHZ), but the second line 565 may have an internal loss value of about −0.18 dB. Accordingly, the transmission line 520 configured with the closed-loop structure of the disclosure has a lower loss than the structure of the transmission line 510. In addition, comparing the third line 570 and the fourth line 575, the third line 570 has an internal loss of about-0.30 dB at a reference frequency (e.g., 3.5 GHZ), but the fourth line 575 may have an internal loss of about −0.44 dB. Accordingly, the transmission line 520 configured with the closed-loop structure of the disclosure has a lower loss than the structure of the transmission line 510.

To summarize the description above, the transmission line 520 configured with the closed-loop (constructed by a metal plate, a conductive adhesive material, and a calibration substrate about an air gap) structure of the disclosure may have a low loss depending on a length, compared to the structure of the transmission line 510 configured with a complex structure for high isolation. The loss may decrease along with a decrease in a loss tangent value and an effective permittivity.

For example, the structure of the transmission line 510 includes a dielectric in a region adjacent to a signal line for signal transfer in the transmission line, but the structure of the transmission line 520 includes a dielectric only in a portion (a lower portion) in the region adjacent to the signal line. Accordingly, the structure of the transmission line 520 including a dielectric and air having a lower loss tangent than the dielectric has an average loss tangent lower than that of the transmission line 510, which may result in a decrease in a transmission loss. In addition, the structure of the transmission line 510 and the structure of the transmission line 520 may have different electrical lengths even if the transmission lines are configured with the same physical length (e.g., 1 lambda, 100 mm) as mentioned with reference to the graph 550. This may be derived through the following equation.

$$\gamma = e^{-\beta l+\alpha l} \quad \text{Equation 1}$$

$\gamma$ may denote a propagation constant of a transmission line, e may denote Euler's number, l may denote a length of the transmission line, $\alpha$ may denote an attenuation constant, and $\beta$ may denote a phase constant.

A relationship between the attenuation constant and the loss tangent may be defined by the following equation.

$$\alpha = \frac{\pi\sqrt{\varepsilon_r}\tan\delta}{\lambda_0} \quad \text{Equation 2}$$

$\alpha$ may denote an attenuation constant, $\varepsilon_r$ may denote a permittivity, tan $\delta$ may denote a loss tangent, and $\lambda_0$ may denote an electrical length.

In summary, the loss tangent may be a loss per unit electrical length in practice. Accordingly, when the transmission line has a fixed physical length, the loss may decrease when the permittivity is low and the electrical length is short. The structure of the transmission line 510 includes a dielectric in both regions adjacent to the signal line, but the structure of the transmission line 520 includes a dielectric only on a portion (a lower portion) of the region adjacent to the signal line. Accordingly, the structure of the transmission line 520 including a dielectric and air having a lower permittivity than the typical dielectric has a low average permittivity (i.e., an effective permittivity) than the structure of the transmission line 510, which may result in a decrease in a transmission loss. Accordingly, the transmission line of the Cal NW with the closed-loop structure according to embodiments of the disclosure may have a loss decreased compared to a transmission line including a signal line isolated through a dielectric.

Figure 6:
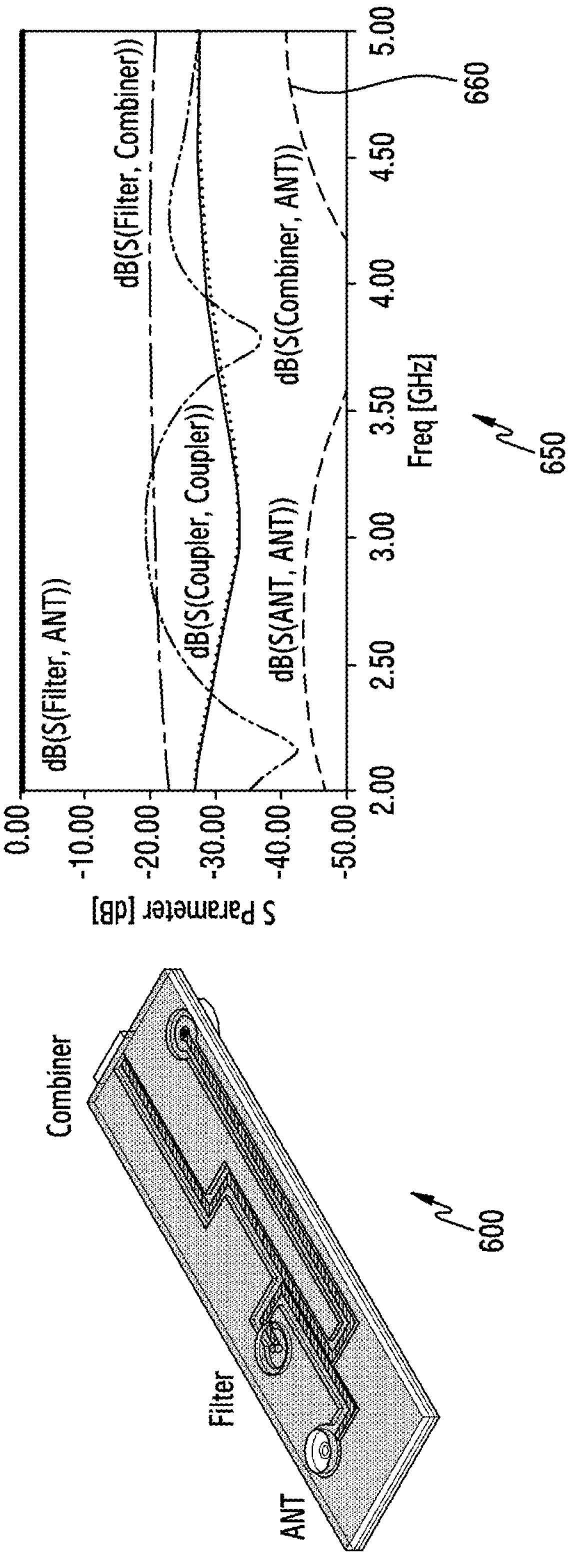
FIG. 6 illustrates an example for a structure and performance of a coupler of a Cal NW with a closed-loop structure according to an embodiment of the disclosure.

FIG. 6 illustrates an example for a structure and performance of a coupler of a Cal NW with a closed-loop structure according to an embodiment of the disclosure.

Referring to FIG. 6, a diagram 600 for a structure of a coupler of a Cal NW with a closed-loop structure according to embodiments of the disclosure and a graph 650 for performance are illustrated. The coupler may be a constructed by deployment (or electrical wiring) of the transmission line 520 configured with a closed-loop structure according to embodiments of the disclosure.

The diagram 600 illustrates a structure of a coupler for coupling an antenna element (ANT) and a filter. One port (e.g., an output port) of the coupler may be coupled to a combiner. Accordingly, the combiner may combine respective signals of the plurality of couplers to integrate the signals into a single signal. The integrated single signal may be a reference signal when the base station 110 of FIG. 1A performs calibration.

The graph 650 illustrates an S parameter depending on frequency between components (an antenna element, a filter, a combiner, a coupler) illustrated in the diagram 600. A horizontal axis of the graph 650 indicates frequency (unit: GHz), and a vertical axis thereof indicates decibels [dB]. The graph 650 illustrates an S parameter between a filter and an antenna element, an S parameter between a filter and a combiner, an S parameter between a coupler and a coupler, an S parameter between a filter and a filter, an S parameter between an antenna element and an antenna element, and an S parameter 660 between a combiner and an antenna element. Each of the S parameters between the coupler and the coupler, between the filter and the filter, and between the antenna element and the antenna element may mean a reflection coefficient. In other words, the S parameter between the coupler and the coupler, between the filter and the filter, and between the antenna element and the antenna element may mean the S parameters between identical couplers, identical filters, and identical antenna elements.

Referring to the S parameter 660 between the combiner and the antenna element, the S parameter has a value lower than −50.00 dB at a frequency band (e.g., about 3.5 GHZ) which is a reference operating frequency. In other words, a coupler constructed of a transmission line with a closed-loop structure according to embodiments of the disclosure may have a high isolation level at an operating frequency. Alternatively, the S parameter between the filter and the antenna may have a low isolation level regardless of the frequency band. That is, when the coupler constructed of the transmission line with the closed-loop structure according to embodiments of the disclosure is used to couple the antenna element and the combiner, this may mean that a signal is not transferred directly from the antenna element to the combiner or from the combiner to the antenna element.

According to the description above, in the PCB structure of the Cal NW with the closed-loop structure according to embodiments of the disclosure, signal interference may not occur between a plurality of antenna elements (i.e., ports or ANT ports). Accordingly, an error of a power level & phase level between ports may not occur. When the power level & phase level between the ports are maintained to be constant, a beam pattern for each port may not be distorted, and beam coverage for each port may be maintained to be a high level. Accordingly, the base station 110 of FIG. 1A may perform beam steering in a target direction.

Figure 7:
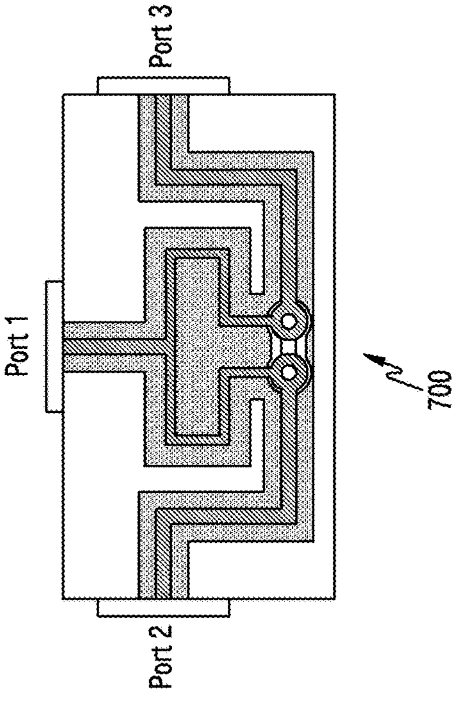
FIG. 7 illustrates an example for a structure and performance of a combiner of a Cal NW with a closed-loop structure according to an embodiment of the disclosure.
Figure 7:
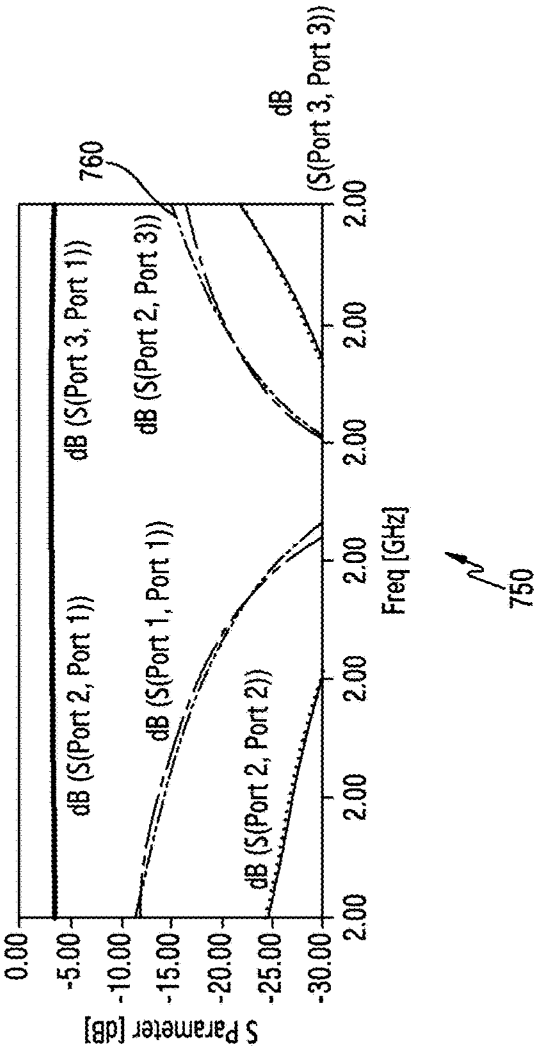

FIG. 7 illustrates an example for a structure and performance of a combiner of a Cal NW with a closed-loop structure according to an embodiment of the disclosure.

Referring to FIG. 7, a diagram 700 for a structure of a combiner of a Cal NW with a closed-loop structure according to embodiments of the disclosure and a graph 750 for performance are illustrated. The combiner may be a constructed by deployment of the transmission line 520 configured with a closed-loop structure according to embodiments of the disclosure.

The diagram 700 illustrates a structure of a combiner for combining signals between a plurality of antenna elements (ANTs). For example, the combiner may couple an output port (i.e., a first port) of the combiner, a port (hereinafter, a second port) of a first antenna element, and a port (i.e., a third port) of a second antenna element. Accordingly, the combiner may combine signals from the plurality of antenna elements to integrate the signals into a single signal. The integrated single signal may be a reference signal when the base station 110 of FIG. 1A performs calibration.

The graph 750 illustrates an S parameter depending on frequency between components illustrated in the diagram 700. A horizontal axis of the graph 750 indicates frequency (unit: GHz), and a vertical axis thereof indicates decibels [dB]. The graph 750 illustrates an S parameter between the first port and the second port, an S parameter between the first port and the third port, an S parameter between the first port and the first port, an S parameter 760 between the second port and the third port, an S parameter between the second port and the second port, and an S parameter between the third port and the third port. Referring to the S parameter 760 between the second port and the third port, the S parameter has a value lower than −30.00 dB at a frequency (e.g., about 3.5 GHZ) band which is a reference operating frequency. In other words, the S parameter between the second port and the first port and the S parameter between the third port and the first port have a high value regardless of the frequency band. This may mean that signals of the second port and third port are well transferred to the first port.

According to the aforementioned description, it may mean that signal leakage between an antenna element and another antenna element does not occur, through the combiner constructed of the transmission line with the closed-loop structure according to embodiments of the disclosure. That is, in the PCB structure of the Cal NW with the closed-loop structure according to embodiments of the disclosure, signal interference may not occur between a plurality of antenna elements (i.e., ports or ANT ports). Accordingly, an error of a power level & phase level between ports may not occur. When the power level & phase level between the ports are maintained to be constant, a beam pattern for each port may not be distorted, and beam coverage for each port may be maintained to be a high level. Accordingly, the base station 110 of FIG. 1A may perform beam steering in a target direction.

Figure 8A:
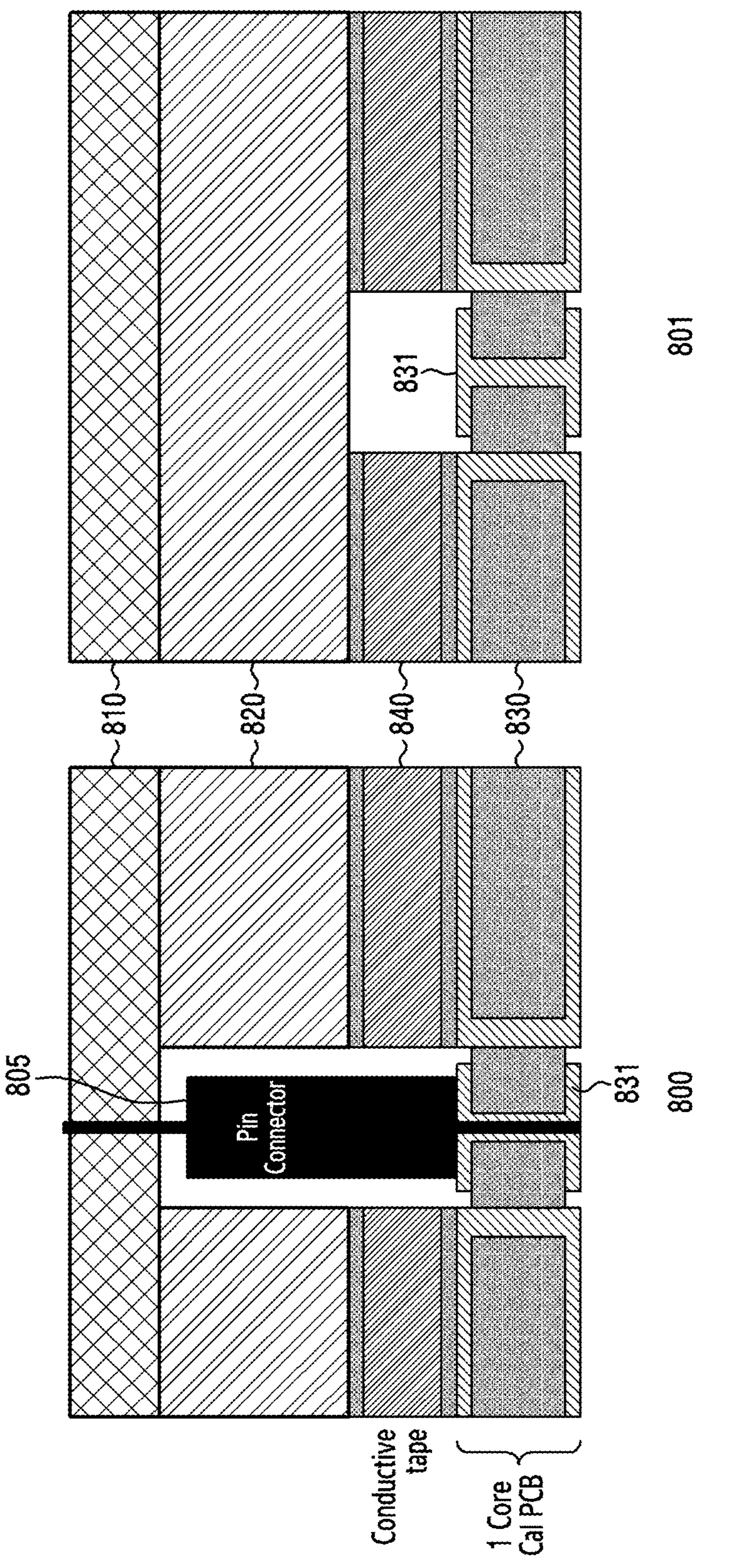
FIG. 8A illustrates an example of a PCB structure including a Cal NW with a closed-loop structure according to an embodiment of the disclosure.

FIG. 8A illustrates an example of a PCB structure including a Cal NW with a closed-loop structure according to an embodiment of the disclosure.

The PCB structure of FIG. 8A may be a PCB including a Cal NW with a structure of the fourth transmission line 256 of FIG. 2C. However, a calibration substrate including the fourth transmission line 256 is for exemplary purposes only, and the disclosure is not limited thereto. The calibration substrate included in the Cal NW may include at least one of the first transmission line 250, the second transmission line 252, the third transmission line 254, and the fourth transmission line 256 or another transmission line structure. An antenna module according to embodiments of the disclosure may include the structure of the PCB and a plurality of antenna elements.

PCBs 800 and 801 of FIG. 8A may be an example for a portion of the AFU of FIG. 1B. For convenience of explanation, a first face may mean a face facing an upward direction of the figure, and a second face may mean a face facing a downward direction of the figure. The PCB 800 may be an example of a structure for a region (i.e., a port or an ANT port) in which an antenna element (not shown) and a signal line 831 of a calibration substrate 830 are coupled. The PCB 801 may be an example of a structure for a region in which the antenna element and the signal line 831 are not coupled.

Referring to FIG. 8A, the PCB 800 may include an antenna element (not shown), an antenna substrate (or an antenna board) 810, a metal plate 820, the calibration substrate 830, a conductive adhesive material 840, and a connector 805.

According to an embodiment, the antenna substrate 810 may be coupled to a plurality of antenna elements (not shown) on a first face. The antenna substrate 810 may be constructed of a dielectric (e.g., PET) and an adhesive material. The antenna substrate 810 may be referred to as an antenna PCB, an antenna board, or an antenna substrate. The antenna substrate 810 may be coupled to a first face of the metal plate 820 on a second face facing away from the first face. The metal plate 820 may be constructed of a conductive material such as metal, to secure a GND region. The metal plate 820 may be coupled to the first face of the conductive adhesive material 840 on a second face of the metal plate.

According to an embodiment, the conductive adhesive material 840 may be a layer or substrate of an adhesive material having conductivity. The conductive adhesive material 840 of FIG. 8A may be constructed of a conductive tape. The conductive adhesive material 840 may be coupled to the metal plate 820 on a first face, and may be coupled to the calibration substrate 830 on the second face. In addition, the conductive adhesive material 840 may include an air gap formed along a region corresponding to a region in which the signal line 831 of the calibration substrate 830 exists. The conductive adhesive material 840 may include adhesive materials having conductivity in a region in which the signal lines 831 of the calibration substrate 830 are not disposed. For example, the adhesive material may refer to a material for metal-to-metal adhesion or metal-to-dielectric adhesion. The conductive adhesive material 840 may be a portion of the Cal NW.

According to an embodiment, the calibration substrate 830 may be constructed of a 1-core substrate, as a structure of the fourth transmission line 256 of FIG. 2C. In other words, the calibration substrate 830 may include a conductor-backed CPW. The calibration substrate 830 may include a signal line 831. The filter may be coupled to the second face of the calibration substrate 830. However, the calibration substrate 830 includes the structure of the fourth transmission line 256, which is for exemplary purposes only. Accordingly, the calibration substrate 830 may include a structure of another transmission line (e.g., the third transmission line 254) or a combination of a plurality of transmission line structures.

According to an embodiment, the PCB 800 may further include the connector 805 coupled to the signal line 831 in a region (e.g., a port or an ANT port) in which the signal line 831 and an antenna element (not shown) are coupled. In case of a region in which the connector 805 is included, the PCB 800 may include an air gap instead of the metal plate 820. Accordingly, an antenna element to be coupled to the PCB 800 and the signal line 831 of the calibration substrate 830 may be coupled. When the electronic device transmits a signal, a signal processed from the filter may be transferred to an antenna element through the signal line 831 and the connector 805. When the electronic device receives a signal, a signal received through the antenna element may be transferred to the filter through the signal line 831 and the connector 805. Although one signal line 831 is illustrated for example in FIG. 8A, the signal line 831 is only for convenience of explanation. Therefore, the calibration substrate 830 may include the plurality of signal lines 831.

Referring to FIG. 8A, the PCB 801 may include the antenna substrate (or an antenna board) 810, the metal plate 820, the calibration substrate 830, and the conductive adhesive material 840.

According to an embodiment, the antenna substrate 810 may be coupled to a plurality of antenna elements (not shown) on a first face. The antenna substrate 810 may be constructed of a dielectric (e.g., PET) and an adhesive material. The antenna substrate 810 may be referred to as an antenna PCB, an antenna board, or an antenna substrate. The antenna substrate 810 may be coupled to a first face of the metal plate 820 on a second face facing away from the first face. The metal plate 820 may be constructed of a conductive material such as metal, to secure a GND region. The metal plate 820 may be coupled to the first face of the conductive adhesive material 840 on a second face of the metal plate.

According to an embodiment, the conductive adhesive material 840 may be a layer or substrate of an adhesive material having conductivity. The conductive adhesive material 840 of FIG. 8A may be constructed of a conductive tape. The conductive adhesive material 840 may be coupled to the metal plate 820 on a first face, and may be coupled to the calibration substrate 830 on the second face. In addition, the conductive adhesive material 840 may include an air gap formed along a region corresponding to a region in which the signal line 831 of the calibration substrate 830 exists. The conductive adhesive material 840 may include adhesive materials having conductivity in a region in which the signal lines 831 of the calibration substrate 830 are not disposed. For example, the adhesive material may refer to a material for metal-to-metal adhesion or metal-to-dielectric adhesion. The conductive adhesive material 840 may be a portion of the Cal NW.

According to an embodiment, the calibration substrate 830 may be constructed of a 1-core substrate, as a structure of the fourth transmission line 256 of FIG. 2C. In other words, the calibration substrate 830 may include a conductor-backed CPW. The calibration substrate 830 may include a signal line 831. The filter may be coupled to the second face of the calibration substrate 830. However, the calibration substrate 830 includes the structure of the fourth transmission line 256, which is for exemplary purposes only. Accordingly, the calibration substrate 830 may include a structure of another transmission line (e.g., the third transmission line 254) or a combination of a plurality of transmission line structures.

According to an embodiment, the PCB 801 may shield an air gap of the conductive adhesive material 840 through the metal plate 820 in a region other than a region (e.g., a port or an ANT port) in which the signal line 831 and an antenna element (not shown) are coupled. Accordingly, a closed loop may be formed through the metal plate 820, the calibration substrate 830, and the conductive adhesive material 840 about the air gap. Although one signal line 831 is illustrated for example in FIG. 8A, the signal line 831 is only for convenience of explanation. Therefore, the calibration substrate 830 may include the plurality of signal lines 831.

As described above, the PCB structure including the Cal NW with the closed-loop structure according to embodiments of the disclosure may form a closed loop through a calibration substrate, a conductive adhesive material, and a metal plate about a region in which an air gap is formed. In other words, the calibration substrate coupled to an RF component such as the filter may be coupled to the metal plate through the conductive adhesive material including the air gap formed along the signal line.

Figure 8B:
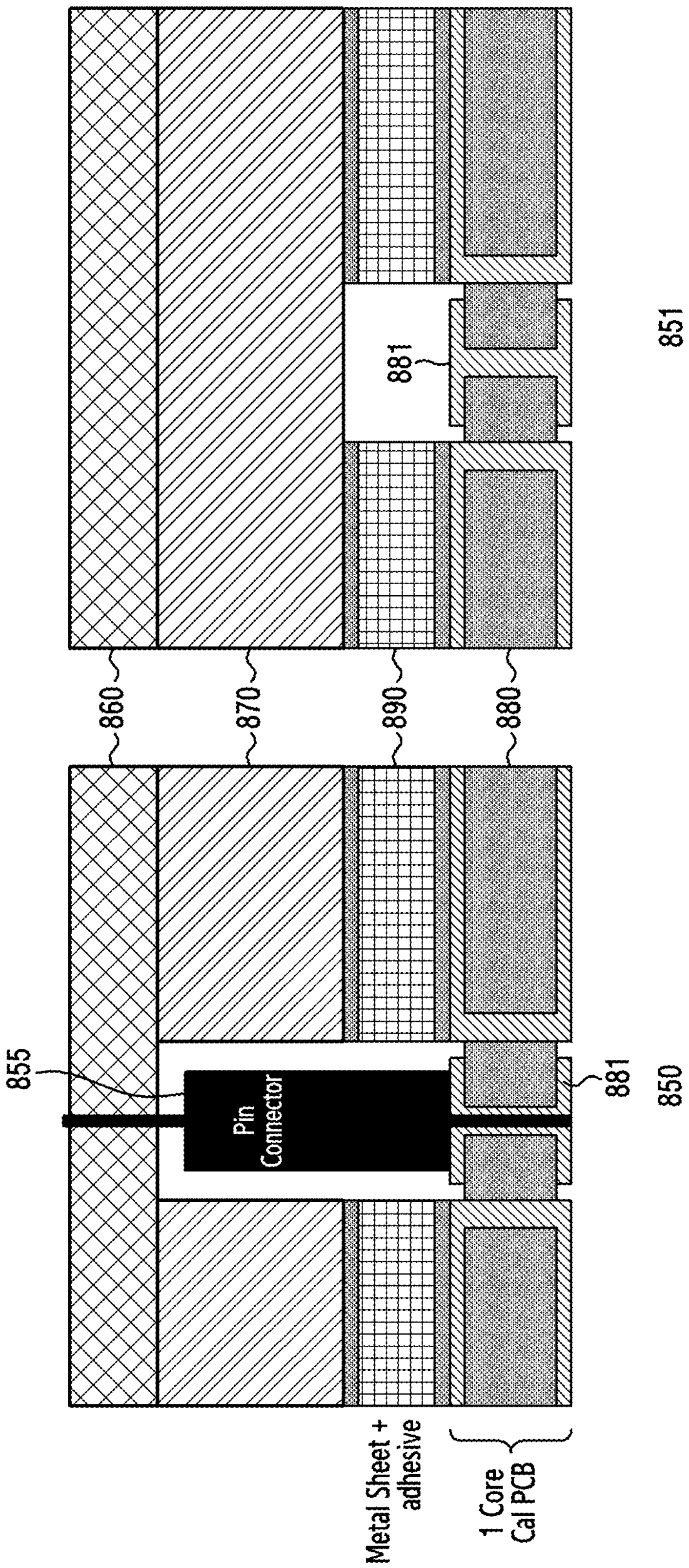
FIG. 8B illustrates an example of a PCB structure including a Cal NW with a closed-loop structure according to an embodiment of the disclosure.

FIG. 8B illustrates an example of a PCB structure including a Cal NW with a closed-loop structure according to an embodiment of the disclosure.

The PCB structure of FIG. 8B may be a PCB including a Cal NW with a structure of the fourth transmission line 256 of FIG. 2C. However, a calibration substrate including the fourth transmission line 256 is for exemplary purposes only, and the disclosure is not limited thereto. The calibration substrate included in the Cal NW may include at least one of the first transmission line 250, the second transmission line 252, the third transmission line 254, and the fourth transmission line 256 or another transmission line structure. An antenna module according to embodiments of the disclosure may include the structure of the PCB and a plurality of antenna elements.

PCBs 850 and 851 of FIG. 8B may be an example for a portion of the AFU of FIG. 1B. For convenience of explanation, a first face may mean a face facing an upward direction of the figure, and a second face may mean a face facing a downward direction of the figure. The PCB 850 may be an example of a structure for a region (i.e., a port or an ANT port) in which an antenna element (not shown) and a signal line 881 of a calibration substrate 880 are coupled. The PCB 851 may be an example of a structure for a region in which the antenna element and the signal line 881 are not coupled.

Referring to FIG. 8B, the PCB 850 may include an antenna element (not shown), an antenna substrate (or an antenna board) 860, a metal plate 870, the calibration substrate 880, a conductive adhesive material 890, and a connector 855.

According to an embodiment, the antenna substrate 860 may be coupled to a plurality of antenna elements (not shown) on a first face. The antenna substrate 860 may be constructed of a dielectric (e.g., PET) and an adhesive material. The antenna substrate 860 may be referred to as an antenna PCB, an antenna board, or an antenna substrate. The antenna substrate 860 may be coupled to a first face of the metal plate 870 on a second face facing away from the first face. The metal plate 870 may be constructed of a conductive material such as metal, to secure a GND region. The metal plate 870 may be coupled to the first face of the conductive adhesive material 890 on a second face of the metal plate.

According to an embodiment, the conductive adhesive material 890 may be a layer or substrate of an adhesive material having conductivity. The conductive adhesive material 890 of FIG. 8B may be constructed of a metal sheet and a conductive tape. The conductive adhesive material 890 may include adhesive layers on a first face and second face of the metal sheet. Accordingly, the conductive adhesive material 890 may be coupled to the metal plate 870 on the first face, and may be coupled to the calibration substrate 880 on the second face. In addition, the conductive adhesive material 890 may include an air gap formed along a region corresponding to a region in which the signal line 881 of the calibration substrate 880 exists. The conductive adhesive material 890 may include adhesive materials having conductivity in a region in which the signal lines 881 of the calibration substrate 880 are not disposed. For example, the adhesive material may refer to a material for metal-to-metal adhesion or metal-to-dielectric adhesion. The conductive adhesive material 890 may be a portion of the Cal NW.

According to an embodiment, the calibration substrate 880 may be constructed of a 1-core substrate, as a structure of the fourth transmission line 256 of FIG. 2C. In other words, the calibration substrate 880 may include a conductor-backed CPW. The calibration substrate 880 may include a signal line 881. The filter may be coupled to the second face of the calibration substrate 880. However, the calibration substrate 880 includes the structure of the fourth transmission line 256, which is for exemplary purposes only. Accordingly, the calibration substrate 880 may include a structure of another transmission line (e.g., the third transmission line 254) or a combination of a plurality of transmission line structures.

According to an embodiment, the PCB 850 may further include the connector 855 coupled to the signal line 881 in a region (e.g., a port or an ANT port) in which the signal line 881 and an antenna element (not shown) are coupled. In case of a region in which the connector 855 is included, the PCB 850 may include an air gap instead of the metal plate 870. Accordingly, an antenna element to be coupled to the PCB 850 and the signal line 881 of the calibration substrate 880 may be coupled. When the electronic device transmits a signal, a signal processed from the filter may be transferred to an antenna element through the signal line 881 and the connector 855. When the electronic device receives a signal, a signal received through the antenna element may be transferred to the filter through the signal line 881 and the connector 855. Although one signal line 881 is illustrated for example in FIG. 8B, the signal line 881 is only for convenience of explanation. Therefore, the calibration substrate 880 may include the plurality of signal lines 881.

Referring to FIG. 8B, the PCB 851 may include the antenna substrate (or an antenna board) 860, the metal plate 870, the calibration substrate 880, and the conductive adhesive material 890.

According to an embodiment, the antenna substrate 860 may be coupled to a plurality of antenna elements (not shown) on a first face. The antenna substrate 860 may be constructed of a dielectric (e.g., PET) and an adhesive material. The antenna substrate 860 may be referred to as an antenna PCB, an antenna board, or an antenna substrate. The antenna substrate 860 may be coupled to a first face of the metal plate 870 on a second face facing away from the first face. The metal plate 870 may be constructed of a conductive material such as metal, to secure a GND region. The metal plate 870 may be coupled to the first face of the conductive adhesive material 890 on a second face of the metal plate.

According to an embodiment, the conductive adhesive material 890 may be a layer or substrate of an adhesive material having conductivity. The conductive adhesive material 890 of FIG. 8B may be constructed of a metal sheet and a conductive tape. The conductive adhesive material 890 may include adhesive layers on a first face and second face of the metal sheet. Accordingly, the conductive adhesive material 890 may be coupled to the metal plate 870 on the first face, and may be coupled to the calibration substrate 880 on the second face. In addition, the conductive adhesive material 890 may include an air gap formed along a region corresponding to a region in which the signal line 881 of the calibration substrate 880 exists. The conductive adhesive material 890 may include adhesive materials having conductivity in a region in which the signal lines 881 of the calibration substrate 880 are not disposed. For example, the adhesive material may refer to a material for metal-to-metal adhesion or metal-to-dielectric adhesion. The conductive adhesive material 890 may be a portion of the Cal NW.

According to an embodiment, the calibration substrate 880 may be constructed of a 1-core substrate, as a structure of the fourth transmission line 256 of FIG. 2C. In other words, the calibration substrate 880 may include a conductor-backed CPW. The calibration substrate 880 may include a signal line 881. The filter may be coupled to the second face of the calibration substrate 880. However, the calibration substrate 880 includes the structure of the fourth transmission line 256, which is for exemplary purposes only. Accordingly, the calibration substrate 880 may include a structure of another transmission line (e.g., the third transmission line 254) or a combination of a plurality of transmission line structures.

According to an embodiment, the PCB 851 may shield an air gap of the conductive adhesive material 890 through the metal plate 870 in a region other than a region (e.g., a port or an ANT port) in which the signal line 881 and an antenna element (not shown) are coupled. Accordingly, a closed loop may be formed through the metal plate 870, the calibration substrate 880, and the conductive adhesive material 890 about the air gap. Although one signal line 881 is illustrated for example in FIG. 8B, the signal line 881 is only for convenience of explanation. Therefore, the calibration substrate 880 may include the plurality of signal lines 881.

As described above, the PCB structure including the Cal NW with the closed-loop structure according to embodiments of the disclosure may form a closed loop through a calibration substrate, a conductive adhesive material, and a metal plate about a region in which an air gap is formed. In other words, the calibration substrate coupled to an RF component such as the filter may be coupled to the metal plate through the conductive adhesive material including the air gap formed along the signal line.

Figure 8C:
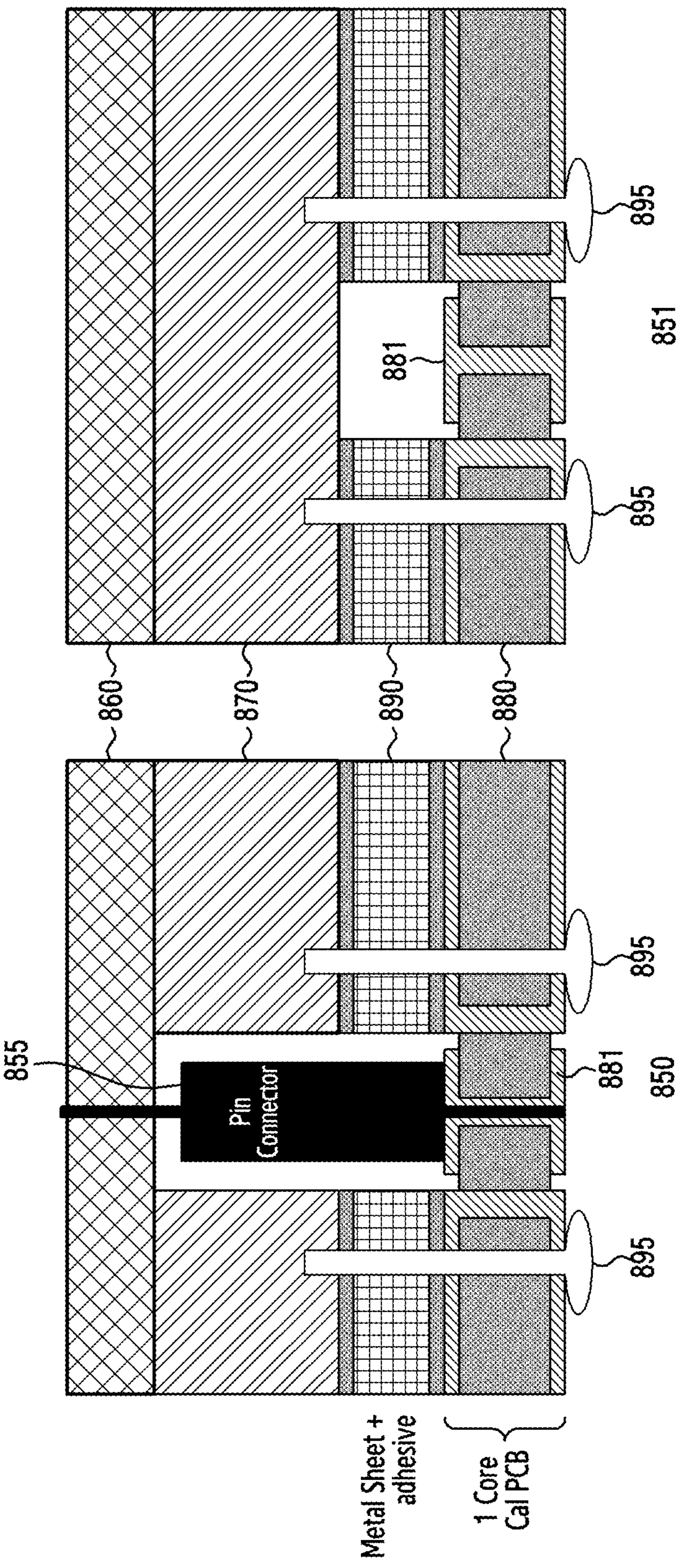
FIG. 8C illustrates an example of a PCB structure including a Cal NW with a closed-loop structure according to an embodiment of the disclosure.

FIG. 8C illustrates an example of a PCB structure including a Cal NW with a closed-loop structure according to embodiments of the disclosure. The PCB structure of FIG. 8C may be a PCB including a Cal NW with a structure of the fourth transmission line 256 of FIG. 2C. However, a calibration substrate including the fourth transmission line 256 is for exemplary purposes only, and the disclosure is not limited thereto. The calibration substrate included in the Cal NW may include at least one of the first transmission line 250, the second transmission line 252, the third transmission line 254, and the fourth transmission line 256 or another transmission line structure. An antenna module according to embodiments of the disclosure may include the structure of the PCB and a plurality of antenna elements.

PCBs 850 and 851 of FIG. 8C may be an example for a portion of the AFU of FIG. 1B. For convenience of explanation, a first face may mean a face facing an upward direction of the figure, and a second face may mean a face facing a downward direction of the figure. The PCB 850 may be an example of a structure for a region (i.e., a port or an ANT port) in which an antenna element (not shown) and a signal line 881 of a calibration substrate 880 are coupled. The PCB 851 may be an example of a structure for a region in which the antenna element and the signal line 881 are not coupled.

Referring to FIG. 8C, the PCB 850 may include an antenna element (not shown), an antenna substrate (or an antenna board) 860, a metal plate 870, the calibration substrate 880, a conductive adhesive material 890, a connector 855, and a bonding member 895.

According to an embodiment, the antenna substrate 860 may be coupled to a plurality of antenna elements (not shown) on a first face. The antenna substrate 860 may be constructed of a dielectric (e.g., PET) and an adhesive material. The antenna substrate 860 may be referred to as an antenna PCB, an antenna board, or an antenna substrate. The antenna substrate 860 may be coupled to a first face of the metal plate 870 on a second face facing away from the first face. The metal plate 870 may be constructed of a conductive material such as metal, to secure a GND region. The metal plate 870 may be coupled to the first face of the conductive adhesive material 890 on a second face of the metal plate.

According to an embodiment, the conductive adhesive material 890 may be a layer or substrate of an adhesive material having conductivity. The conductive adhesive material 890 of FIG. 8C may be constructed of a metal sheet and a conductive tape. Although it is illustrated in FIG. 8C that the conductive adhesive material 890 includes a metal sheet and adhesive layers, the conductive adhesive material 890 may be constructed of a conductive tape such as the conductive adhesive material 840 of FIG. 8A. The conductive adhesive material 890 may include adhesive layers on a first face and second face of the metal sheet. Accordingly, the conductive adhesive material 890 may be coupled to the metal plate 870 on the first face, and may be coupled to the calibration substrate 880 on the second face. In addition, the conductive adhesive material 890 may include an air gap formed along a region corresponding to a region in which the signal line 881 of the calibration substrate 880 exists. The conductive adhesive material 890 may include adhesive materials having conductivity in a region in which the signal lines 881 of the calibration substrate 880 are not disposed. For example, the adhesive material may refer to a material for metal-to-metal adhesion or metal-to-dielectric adhesion. The conductive adhesive material 890 may be a portion of the Cal NW.

According to an embodiment, the calibration substrate 880 may be constructed of a 1-core substrate, as a structure of the fourth transmission line 256 of FIG. 2C. In other words, the calibration substrate 880 may include a conductor-backed CPW. The calibration substrate 880 may include a signal line 881. The filter may be coupled to the second face of the calibration substrate 880. However, the calibration substrate 880 includes the structure of the fourth transmission line 256, which is for exemplary purposes only. Accordingly, the calibration substrate 880 may include a structure of another transmission line (e.g., the third transmission line 254) or a combination of a plurality of transmission line structures.

According to an embodiment, the PCB 851 may further include the connector 855 coupled to the signal line 881 in a region (e.g., a port or an ANT port) in which the signal line 881 and an antenna element (not shown) are coupled. In case of a region in which the connector 855 is included, the PCB 851 may include an air gap instead of the metal plate 870. Accordingly, an antenna element to be coupled to the PCB 851 and the signal line 881 of the calibration substrate 880 may be coupled. When the electronic device transmits a signal, a signal processed from the filter may be transferred to an antenna element through the signal line 881 and the connector 855. When the electronic device receives a signal, a signal received through the antenna element may be transferred to the filter through the signal line 881 and the connector 855. Although on signal line 881 is illustrated for example in FIG. 8B, the signal line 881 is only for convenience of explanation. Therefore, the calibration substrate 880 may include the plurality of signal lines 881.

According to an embodiment, the PCB 850 may further include the bonding member 895. For example, the PCB 850 may further include at least one bonding member 895. The bonding member 895 may be configured to increase bonding force between the calibration substrate 880 and the metal plate 870 by using the conductive adhesive material 890. For example, the bonding member 895 may include a rivet or a screw. In addition, the bonding member 895 may be added to a region in which higher bonding force is required. For example, the bonding member 895 may be added to a region in which the signal lines 881 are densely present, or a region adjacent to a region in which an antenna port exists.

Referring to FIG. 8C, the PCB 851 may include the antenna substrate (or the antenna board) 860, the metal plate 870, the calibration substrate 880, the conductive adhesive material 890, and the connector 855.

According to an embodiment, the antenna substrate 860 may be coupled to a plurality of antenna elements (not shown) on a first face. The antenna substrate 860 may be constructed of a dielectric (e.g., PET) and an adhesive material. The antenna substrate 860 may be referred to as an antenna PCB, an antenna board, or an antenna substrate. The antenna substrate 860 may be coupled to a first face of the metal plate 870 on a second face facing away from the first face. The metal plate 870 may be constructed of a conductive material such as metal, to secure a GND region. The metal plate 870 may be coupled to the first face of the conductive adhesive material 890 on a second face of the metal plate.

According to an embodiment, the conductive adhesive material 890 may be a layer or substrate of an adhesive material having conductivity. The conductive adhesive material 890 of FIG. 8C may be constructed of a metal sheet and a conductive tape. Although it is illustrated in FIG. 8C that the conductive adhesive material 890 includes a metal sheet and adhesive layers, the conductive adhesive material 890 may be constructed of a conductive tape such as the conductive adhesive material 840 of FIG. 8A. The conductive adhesive material 890 may be coupled to the metal plate 870 on a first face, and may be coupled to the calibration substrate 880 on the second face. In addition, the conductive adhesive material 890 may include an air gap formed along a region corresponding to a region in which the signal line 881 of the calibration substrate 880 exists. The conductive adhesive material 890 may include adhesive materials having conductivity in a region in which the signal lines 881 of the calibration substrate 880 are not disposed. For example, the adhesive material may refer to a material for metal-to-metal adhesion or metal-to-dielectric adhesion. The conductive adhesive material 890 may be a portion of the Cal NW.

According to an embodiment, the calibration substrate 880 may be constructed of a 1-core substrate, as a structure of the fourth transmission line 256 of FIG. 2C. In other words, the calibration substrate 880 may include a conductor-backed CPW. The calibration substrate 880 may include a signal line 881. The filter may be coupled to the second face of the calibration substrate 880. However, the calibration substrate 880 includes the structure of the fourth transmission line 256, which is for exemplary purposes only. Accordingly, the calibration substrate 880 may include a structure of another transmission line (e.g., the third transmission line 254) or a combination of a plurality of transmission line structures.

According to an embodiment, the PCB 851 may shield an air gap of the conductive adhesive material 890 through the metal plate 870 in a region other than a region (e.g., a port or an ANT port) in which the signal line 881 and an antenna element (not shown) are coupled. Accordingly, a closed loop may be formed through the metal plate 870, the calibration substrate 880, and the conductive adhesive material 890 about the air gap. Although one signal line 881 is illustrated for example in FIG. 8C, the signal line 881 is only for convenience of explanation. Therefore, the calibration substrate 880 may include the plurality of signal lines 881.

According to an embodiment, the PCB 850 may further include the bonding member 895. For example, the PCB 850 may further include at least one bonding member 895. The bonding member 895 may be configured to increase bonding force between the calibration substrate 880 and the metal plate 870 by using the conductive adhesive material 890. For example, the bonding member 895 may include a rivet or a screw. In addition, the bonding member 895 may be added to a region in which higher bonding force is required. For example, the bonding member 895 may be added to a region in which the signal lines 881 are densely present, or a region adjacent to a region in which an antenna port exists.

As described above, the PCB structure including the Cal NW with the closed-loop structure according to embodiments of the disclosure may form a closed loop through a calibration substrate, a conductive adhesive material, and a metal plate about a region in which an air gap is formed. In other words, the calibration substrate coupled to an RF component such as the filter may be coupled to the metal plate through the conductive adhesive material including the air gap formed along the signal line.

Referring to FIGS. 1A, 1B, 2A to 2C, 3A, 3B, 4 to 7, and 8A to 8C, a PCB structure including a Cal NW with a closed-loop structure according to embodiments of the disclosure and a structure of an antenna module including the PCB structure may be produced with lower cost than the conventional antenna structure, and may have improved signal transmission efficiency by minimizing a tolerance in a manufacturing process. For example, in the PCB structure including the Cal NW with the closed-loop structure according to embodiments of the disclosure and the antenna module including the PCB structure, instead of a calibration substrate including a transmission line with a complex structure, a transmission line with a simple structure and a conductive adhesive material are used to produce the PCB and the antenna module including the PCB in a cost effective manner. In addition, a process of manufacturing a structure including a Cal NW according to embodiments of the disclosure is simpler than a process of manufacturing a Cal NW (including a calibration substrate) including a transmission line with a complex structure, thereby minimizing a tolerance.

As another example, in the PCB structure including the Cal NW with the closed-loop structure according to embodiments of the disclosure and the structure of the antenna module including the PCB structure, an air gap is formed in a portion of a region in which a signal line is disposed, thereby improving signal transmission efficiency, compared to a calibration substrate structure including a dielectric about a line (a signal line) for transferring a signal inside a transmission line.

In other words, the disclosure makes it possible to produce a transmission line having a high isolation level and a calibration substrate including the transmission line with lost cost. In addition, according to the disclosure, a transmission line has a high isolation level and transmission efficiency of the transmission line is improved, thereby decreasing an internal loss. In addition, according to the disclosure, a Cal NW structure including a conductive adhesive material may be used to make a manufacturing process relatively simple and to minimize a tolerance.

Although the PCB structure including the Cal NW with the closed-loop structure according to embodiments of the disclosure and the structure of the antenna module have been described with reference to FIGS. 1A, 1B, 2A to 2C, 3A, 3B, 4 to 7, and 8A to 8C, an MMU or mmWave device in which a plurality of additional components such as a plurality of antenna elements, an RF component (e.g., filter, etc.), and a mother board are coupled to constitute one apparatus may also be understood as an embodiment of the disclosure. An example in which the PCB structure including the Cal NW with the closed-loop structure according to embodiments of the disclosure and the structure of the antenna module including the PCB structure are mounted to implement the electronic device is described with reference to FIG. 9.

Figure 9:
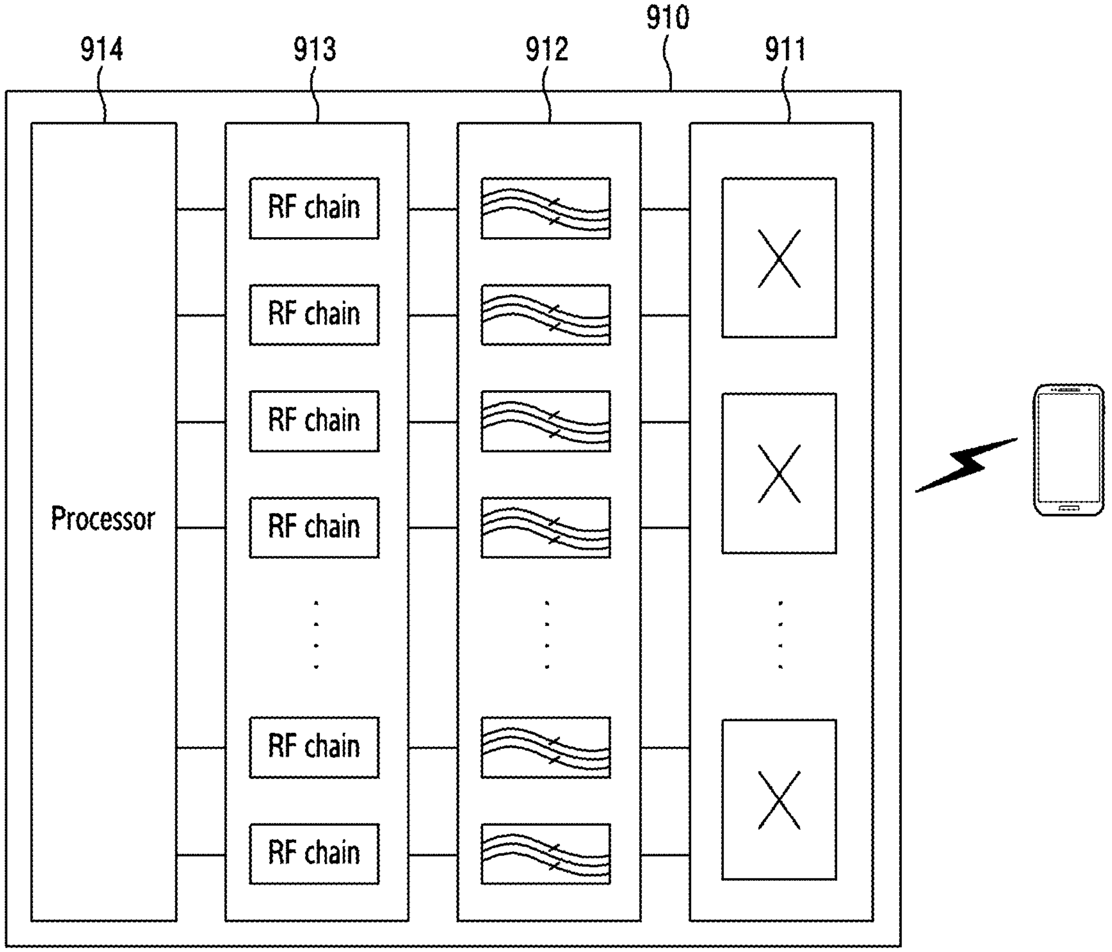
FIG. 9 illustrates a functional configuration of an electronic device according to an embodiment of the disclosure.

FIG. 9 illustrates a functional configuration of an electronic device according to an embodiment of the disclosure.

An electronic device 910 may be one of a base station and a terminal. According to an embodiment, the electronic device 910 may be an MMU or mmWave device. Not only the PCB structure itself mentioned through FIGS. 1A, 1B, 2A to 2C, 3A, 3B, 4 to 7, and 8A to 8C but also an antenna module including the PCB structure and an electronic device including the antenna module are also included in embodiments of the disclosure.

Referring to FIG. 9, a functional configuration of the electronic device 910 is illustrated. The electronic device 910 may include an antenna unit 911, a filter unit 912, a Radio Frequency (RF) processing unit 913, and a control unit 914.

The antenna unit 911 may include a plurality of antennas. The antenna performs functions for transmitting and receiving signals through a radio channel. The antenna may include a radiator formed on a substrate (e.g., an antenna PCB, an antenna board). The antenna may radiate an up-converted signal on the radio channel or obtain a signal radiated by another device. Each antenna may be referred to as an antenna element or an antenna device. In some embodiments, the antenna unit 911 may include an antenna array (e.g., a sub array) in which a plurality of antenna elements constitute an array. The antenna unit 911 may be electrically coupled to the filter unit 912 through RF signal lines. The antenna unit 911 may be mounted on a PCB including a plurality of antenna elements. The PCB may include a plurality of RF signal lines to couple each antenna element and a filter of the filter unit 912. The RF signal lines may be referred to as a feeding network. The antenna unit 911 may provide a received signal to the filter unit 912 or may radiate the signal provided from the filter unit 912 into the air.

According to various embodiments, the antenna unit 911 may include at least one antenna module having a dual-polarization antenna. The dual-polarization antenna may be, for example, a cross-pol (x-pol) antenna. The dual-polarization antenna may include two antenna elements corresponding to different polarizations. For example, the dual-polarization antenna may include a first antenna element having a polarization of +45° and a second antenna element having a polarization of −45°. It is obvious that the polarization may be formed of other polarizations orthogonal to each other, in addition to +45° and −45°. Each antenna element may be coupled to a feeding line, and may be electrically coupled to the filter unit 912, the RF processing unit 913, and the control unit 914 to be described below.

According to an embodiment, the dual-polarization antenna may be a patch antenna (or a micro-strip antenna). Since the dual-polarization antenna has a form of a patch antenna, it may be easily implemented and integrated as an array antenna. Two signals having different polarizations may be input to respective antenna ports. Each antenna port corresponds to an antenna element. For high efficiency, it is required to optimize a relationship between a co-pol characteristic and a cross-pol characteristic between the two signals having the different polarizations. In the dual-polarization antenna, the co-pol characteristic indicates a characteristic for a specific polarization component and the cross-pol characteristic indicates a characteristic for a polarization component different from the specific polarization component. The antenna element coupled to the PCB structure including the Cal NW with the closed-loop structure according to embodiments of the disclosure may be included in the antenna unit 911 of FIG. 9.

The filter unit 912 may perform filtering to transmit a signal of a desired frequency. The filter unit 912 may perform a function for selectively identifying a frequency by forming a resonance. In some embodiments, the filter unit 912 may structurally form the resonance through a cavity including a dielectric. In addition, in some embodiments, the filter unit 912 may form a resonance through elements which form inductance or capacitance. In addition, in some embodiments, the filter unit 912 may include a Bulk Acoustic Wave (BAW) filter or a Surface Acoustic Wave (SAW) filter. The filter unit 912 may include at least one of a band pass filter, a low pass filter, a high pass filter, and a band reject filter. That is, the filter unit 912 may include RF circuits for obtaining a signal of a frequency band for transmission or a frequency band for reception. The filter unit 912 according to various embodiments may electrically couple the antenna unit 911 and the RF processing unit 913 to each other. An Antenna Filter Unit (AFU) to which the PCB structure including the Cal NW with the closed-loop structure of the disclosure is applicable may include the antenna unit 911 and the filter unit 912.

The RF processing unit 913 may include a plurality of RF paths. The RF path may be a unit of a path through which a signal received through an antenna or a signal radiated through the antenna passes. At least one RF path may be referred to as an RF chain. The RF chain may include a plurality of RF elements. The RF elements may include an amplifier, a mixer, an oscillator, a Digital-to-Analog Converter (DAC), an Analog-to-Digital Converter (ADC), or the like. For example, the RF processing unit 913 may include an up converter which up-converts a digital transmission signal of a baseband to a transmission frequency, and a DAC which converts the converted digital transmission signal into an analog RF transmission signal. The converter and the DAC constitute a transmission path in part. The transmission path may further include a Power Amplifier (PA) or a coupler (or a combiner). In addition, for example, the RF processing unit 913 may include an ADC which converts an analog RF reception signal into a digital reception signal and a down converter which converts the digital reception signal into a digital reception signal of a baseband. The ADC and the down converter constitute a reception path in part. The reception path may further include a Low-Noise Amplifier (LNA) or a coupler (or a divider). RF parts of the RF processing unit may be implemented on a PCB. The electronic device 910 may include a structure in which the antenna unit 911, the filter unit 912, and the RF processing unit 913 are layered in that order. The antennas and the RF parts of the RF processing unit may be implemented on the PCB, and filters may be repeatedly fastened between one PCB and another PCB to constitute a plurality of layers. A Radio Unit (RU) (e.g., the RU of FIG. 1B) of an MMU device or mmWave device to which a PCB structure including a Cal NW with a closed-loop structure of the disclosure is applicable may include the RF processing unit 913.

The control unit 914 may provide overall control to the electronic device 910. The control unit 914 may include various modules for performing communication. The control unit 914 may include at least one processor such as a modem. The control unit 914 may include modules for digital signal processing. For example, the control unit 914 may include a modem. In data transmission, the control unit 914 generates complex symbols by encoding and modulating a transmission bit-stream. In addition, for example, in data reception, the control unit 914 restores a reception bit-stream by demodulating and decoding a baseband signal. The control unit 914 may perform functions of a protocol stack required in a communication standard.

The functional configuration of the electronic device 910 is described in FIG. 9 as an apparatus capable of utilizing a PCB structure including a Cal NW with a closed-loop structure of the disclosure. However, the example of FIG. 9 is only an exemplary configuration for utilizing the PCB structure including the Cal NW with the closed-loop structure and a structure of an antenna module including the PCB structure according to embodiments of the disclosure described through FIGS. 1A, 1B, 2A to 2C, 3A, 3B, 4 to 7, and 8A to 8C, and embodiments of the disclosure are not limited to components of the apparatus of FIG. 9. Therefore, a Cal NW including a conductive adhesive material and transmission line with a closed-loop structure according to embodiments of the disclosure, a PCB structure including the Cal NW with the closed-loop structure, an antenna module including the PCB structure, and a communication device of a difference construction including the antenna module may be understood as an embodiment of the disclosure.

As described above, a module in a wireless communication system according to an embodiment of the disclosure may include a plurality of antenna elements, an antenna substrate coupled to the plurality of antenna elements, a metal plate coupled to the antenna substrate, a calibration substrate coupled to a Radio Frequency (RF) component on a first face, and a conductive adhesive material for electrical coupling between the metal plate and the calibration substrate. The conductive adhesive material may be coupled to the calibration substrate on a second face different from the first face of the calibration substrate. The conductive adhesive material may include an air gap formed along a signal line included in the calibration substrate.

In an embodiment, the module may further include a connector in a region corresponding to a region in which one antenna element among the plurality of antenna elements is electrically coupled to the signal line.

In an embodiment, the connector may be disposed inside the air gap to electrically couple one region of the signal line and the antenna element. The connector may be a pin connector.

In an embodiment, a region of the metal plate, corresponding to a region in which the connector is disposed, may include another air gap.

In an embodiment, the conductive adhesive material may include a conductive tape or a metal sheet and adhesive layers.

In an embodiment, the calibration substrate including the signal line may include a transmission line of a conductor-backed Coplanar Waveguide (CPW) structure.

In an embodiment, the calibration substrate may include a coupler. The coupler may be a first portion of the transmission line disposed to a region adjacent to a region in which one antenna element among the plurality of antenna elements is electrically coupled to the signal line.

In an embodiment, the calibration substrate may further include a combiner and a different coupler other than the aforementioned coupler. The combiner may be a second portion of the transmission line disposed to a region in which the coupler and the different coupler are coupled.

In an embodiment, the module may further include a bonding member. The bonding member may be coupled to the metal plate by penetrating the calibration substrate and the conductive adhesive material. The bonding member may include a screw or a rivet.

In an embodiment, the RF component may include a filter.

As described above, a Massive Multiple Input Multiple Output (MIMO) Unit (MMU) device according to an embodiment of the disclosure may include a main board, a Radio Frequency Integrated Circuit (RFIC) disposed to the main board, and a plurality of antenna modules disposed to the main board. Each of the plurality of antenna modules may include a plurality of antenna elements, an antenna substrate coupled to the plurality of antenna elements, a metal plate coupled to the antenna substrate, a calibration substrate coupled to an RF component on a first face, and a conductive adhesive material for electrical coupling between the metal plate and the calibration substrate. The conductive adhesive material may be coupled to the calibration substrate on a second face different from the first face of the calibration substrate. The conductive adhesive material may include an air gap formed along a signal line included in the calibration substrate.

In an embodiment, the MMU device may further include connector in a region corresponding to a region in which one antenna element among the plurality of antenna elements is electrically coupled to the signal line.

In an embodiment, the connector may be disposed inside the air gap to electrically couple one region of the signal line and the antenna element. The connector may be a pin connector.

In an embodiment, a region of the metal plate, corresponding to a region in which the connector is disposed, may include another air gap.

In an embodiment, the conductive adhesive material may include a conductive tape or a metal sheet and adhesive layers.

In an embodiment, the calibration substrate including the signal line may include a transmission line of a conductor-backed CPW structure.

In an embodiment, the calibration substrate may include a coupler. The coupler may be a first portion of the transmission line disposed to a region adjacent to a region in which one antenna element among the plurality of antenna elements is electrically coupled to the signal line.

In an embodiment, the calibration substrate may further include a combiner and a different coupler other than the aforementioned coupler. The combiner may be a second portion of the transmission line disposed to a region in which the coupler and the different coupler are coupled.

In an embodiment, the MMU device may further include a bonding member. The bonding member may be coupled to the metal plate by penetrating the calibration substrate and the conductive adhesive material. The bonding member may include a screw or a rivet.

In an embodiment, the RF component may include a filter.

In an embodiment, the signal line of the calibration substrate may include a plurality of signal lines.

In an embodiment, the plurality of signal lines may be disposed on a second layer of the calibration substrate.

In an embodiment, a portion of the second layer of the calibration substrate may include a ground region.

Methods based on the embodiments disclosed in the claims and/or specification of the disclosure may be implemented in hardware, software, or a combination of both.

When implemented in software, computer readable recording medium for storing one or more programs (i.e., software modules) may be provided. The one or more programs stored in the computer readable recording medium are configured for execution performed by one or more processors in the electronic device. The one or more programs include instructions for allowing the electronic device to execute the methods based on the embodiments disclosed in the claims and/or specification of the disclosure.

The program (i.e., the software module or software) may be stored in a random access memory, a non-volatile memory including a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs) or other forms of optical storage devices, and a magnetic cassette. Alternatively, the program may be stored in a memory configured in combination of all or some of these storage media. In addition, the configured memory may be plural in number.

Further, the program may be stored in an attachable storage device capable of accessing the electronic device through a communication network such as the Internet, an Intranet, a Local Area Network (LAN), a Wide LAN (WLAN), or a Storage Area Network (SAN) or a communication network configured by combining the networks. The storage device may have access to a device for performing an embodiment of the disclosure via an external port. In addition, an additional storage device on a communication network may have access to the device for performing the embodiment of the disclosure.

In the aforementioned specific embodiments of the disclosure, a component included in the disclosure is expressed in a singular or plural form according to the specific embodiment proposed herein. However, the singular or plural expression is selected properly for a situation proposed for the convenience of explanation, and thus the various embodiments of the disclosure are not limited to a single or a plurality of components. Therefore, a component expressed in a plural form may also be expressed in a singular form, or vice versa.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A module in a wireless communication system, the module comprising:

a metal plate coupled to an antenna substrate;

a calibration substrate; and a conductive adhesive material electrically coupling the metal plate and the calibration substrate, wherein the conductive adhesive material comprises an air gap formed corresponding to a signal line included in the calibration substrate.

2. The module of claim 1, further comprising:

a plurality of antenna elements coupled to the antenna substrate; and a connector electrically connecting one antenna element among the plurality of antenna elements to the signal line.

3. The module of claim 2, wherein the air gap extends to an area of the metal plate corresponding to the connector.

4. The module of claim 3, wherein the connector is disposed inside the air gap.

5. The module of claim 2, wherein the connector is a pin connector.

6. The module of claim 2, wherein the calibration substrate comprises a coupler, and wherein the coupler is a first portion of the signal line disposed to a region adjacent to a region in which the one antenna element among the plurality of antenna elements is electrically coupled to the signal line.

7. The module of claim 6, wherein the calibration substrate further comprises a combiner and a different coupler other than the coupler, and wherein the combiner is a second portion of the signal line disposed to a region in which the coupler and the different coupler are coupled.

8. The module of claim 1, further comprising a filter coupled to the calibration substrate on an opposite side of the conductive adhesive material.

9. The module of claim 1, wherein the conductive adhesive material comprises a conductive tape or a metal sheet and adhesive layers.

10. The module of claim 1, wherein the calibration substrate including the signal line comprises a transmission line of a conductor-backed coplanar waveguide (CPW) structure.

11. A massive multiple input multiple output (MIMO) unit (MMU) device comprising:

a main board;

a radio frequency integrated circuit (RFIC) disposed to the main board; and a plurality of antenna modules disposed to the main board, wherein each of the plurality of antenna modules comprises:

a metal plate coupled to an antenna substrate, a calibration substrate, and a conductive adhesive material electrically coupling the metal plate and the calibration substrate, and wherein the conductive adhesive material comprises an air gap formed corresponding to a signal line included in the calibration substrate.

12. The MMU device of claim 11, further comprising:

a plurality of antenna elements coupled to the antenna substrate; and a connector electrically connecting one antenna element among the plurality of antenna elements to the signal line.

13. The MMU device of claim 12, wherein the air gap extends to an area of the metal plate corresponding to the connector.

14. The MMU device of claim 13, wherein the connector is disposed inside the air gap.

15. The MMU device of claim 12, wherein the connector is a pin connector.

16. The MMU device of claim 12, wherein the calibration substrate comprises a coupler, and wherein the coupler is a first portion of the signal line disposed to a region adjacent to a region in which the one antenna element among the plurality of antenna elements is electrically coupled to the signal line.

17. The MMU device of claim 16, wherein the calibration substrate further comprises a combiner and a different coupler other than the coupler, and wherein the combiner is a second portion of the signal line disposed to a region in which the coupler and the different coupler are coupled.

18. The MMU device of claim 11, further comprising a filter coupled to the calibration substrate on an opposite side of the conductive adhesive material.

19. The MMU device of claim 11, wherein the conductive adhesive material comprises a conductive tape or a metal sheet and adhesive layers.

20. The MMU device of claim 11, wherein the calibration substrate including the signal line comprises a transmission line of a conductor-backed coplanar waveguide (CPW) structure.

* * * * *